(12) United States Patent
Uehara et al.

(10) Patent No.: US 11,724,189 B2
(45) Date of Patent: Aug. 15, 2023

(54) NON-TRANSITORY COMPUTER READABLE MEDIUM, INFORMATION PROCESSING METHOD, AND GAME DEVICE USING HIT PROCESSING OF TARGET PARTS ON A TARGET OBJECT

(71) Applicant: CYGAMES, INC., Tokyo (JP)

(72) Inventors: Mitsuaki Uehara, Tokyo (JP); Kengo Moritsuki, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/324,671

(22) Filed: May 19, 2021

(65) Prior Publication Data

US 2021/0268383 A1    Sep. 2, 2021

Related U.S. Application Data

(63) Continuation of application No. PCT/JP2019/044695, filed on Nov. 14, 2019.

(30) Foreign Application Priority Data

Nov. 29, 2018   (JP) .................. 2018-223328

(51) Int. Cl.
*A63F 13/577*   (2014.01)
*A63F 13/58*   (2014.01)
*A63F 13/5372*   (2014.01)

(52) U.S. Cl.
CPC ........ *A63F 13/577* (2014.09); *A63F 13/5372* (2014.09); *A63F 13/58* (2014.09)

(58) Field of Classification Search
CPC .... A63F 13/35; A63F 13/5372; A63F 13/577; A63F 13/58; A63F 13/833
See application file for complete search history.

(56) References Cited

U.S. PATENT DOCUMENTS 7,001,272 B2 * 2/2006 Yamashita ............ A63F 13/213
                                                                463/31
7,140,962 B2 * 11/2006 Okuda .................. A63F 13/843
                                                                463/2

(Continued)

FOREIGN PATENT DOCUMENTS

JP    2004-230179 A    8/2004
JP       5758085 B2    8/2015
JP    2017-131506 A    8/2017

OTHER PUBLICATIONS

DemonWaffleGG. "Fallout 4 V.A.T.S. (Tutorial)." Nov. 21, 2015. YouTube video. Accessed May 20, 2022. <https://www.youtube.com/watch?v=Vgjt6mj6J3k> (Year: 2015).*

(Continued)

*Primary Examiner* — William H McCulloch, Jr.
(74) *Attorney, Agent, or Firm* — Osha Bergman Watanabe & Burton LLP

(57) ABSTRACT

A non-transitory computer readable medium stores a program causing a computer to execute: moving at least one of a player object or a target object displayed in a virtual game space, the player object including a target area, the target object including a plurality of target parts; identifying the target parts included in the target area; when more than one target part of the plurality of target parts is included in the target area, setting a target from among the target parts in the target area on the basis of a comparison of comparative values set or calculated for the individual target parts; and executing predetermined hit processing on the target part set as the target.

6 Claims, 22 Drawing Sheets

(56) References Cited

U.S. PATENT DOCUMENTS

| | | | |
|---|---|---|---|
| 9,545,571 B2* | 1/2017 | Johnson | A63F 13/45 |
| 10,350,493 B2* | 7/2019 | Kurabayashi | A63F 13/822 |
| 10,532,280 B2* | 1/2020 | Ishizawa | A63F 13/2145 |
| 10,599,256 B2* | 3/2020 | Kurabayashi | G06F 3/0416 |
| 10,675,538 B2* | 6/2020 | Kurabayashi | A63F 13/2145 |
| 11,062,137 B2* | 7/2021 | Kurabayashi | G06Q 30/0224 |
| 11,389,724 B2* | 7/2022 | Takafuji | A63F 13/46 |
| 2001/0029202 A1 | 10/2001 | Kondo et al. | |
| 2002/0151337 A1* | 10/2002 | Yamashita | A63F 13/245 463/8 |
| 2004/0009798 A1* | 1/2004 | Okuda | A63F 13/10 463/7 |
| 2005/0026684 A1* | 2/2005 | Sumi | A63F 13/537 463/31 |
| 2005/0272506 A1* | 12/2005 | Sumi | A63F 13/837 463/51 |
| 2006/0287027 A1* | 12/2006 | Hardisty | A63F 13/5255 463/8 |
| 2009/0247250 A1* | 10/2009 | Kato | A63F 13/837 463/2 |
| 2011/0287843 A1* | 11/2011 | Yamada | A63F 13/577 463/43 |
| 2014/0172432 A1* | 6/2014 | Sendai | G02B 27/0172 704/276 |
| 2015/0375110 A1 | 12/2015 | Volkov | |
| 2016/0263481 A1* | 9/2016 | Yamagami | A63F 13/537 |
| 2021/0268383 A1* | 9/2021 | Uehara | A63F 13/577 |

OTHER PUBLICATIONS

Bell, Larryn. "Fallout 4: How to Use V.A.T.S." Sep. 26, 2017. USgamer website. Accessed May 20, 2022. 7 pages. <https://www.usgamer.net/articles/26-09-2017-fallout-4-how-to-use-vats> (Year: 2017).*

International Search Report issued in Application No. PCT/JP2019/044695, dated Dec. 17, 2019 (5 pages).

Written Opinion issued in International Application No. PCT/JP2019/044695, dated Dec. 17, 2019 (5 pages).

"Not Your Average Romance of the Three Kingdoms: "SEKIHEKI", the Groundbreaking MMORPG that Takes Battle to the Limit;" Nov. 27, 2019; Retrieved from the Internet: URL: https://www.4gamer.net/games/048/G004821/20090507037/ (12 pages).

"Strategy and Tactics/Fight It Out! Game System: The Game System of Ogre Battle 64;" Nov. 27, 2019; Retrieved from the Internet: URL: http://www.nintendo.co.jp/n01/n64/software/nus_p_nobj/system/tactics/fight/index.html (6 pages).

"Monster Hunter World—Let's Learn about Flesh Toughness and Weak Points! Monster Hunter World: Iceborne Strategy WIKI (MHWI Strategy);" Nov. 27, 2019; Retrieved from the Internet: URL: https://wiki.denfaminicogamer.ipmonsterhunterworld/ (7 pages).

Notice of Reasons for Refusal issued in Japanese Application No. 2018-223328, dated Nov. 26, 2019 (4 pages).

* cited by examiner

| TARGET PART TP | DAMAGE COEFFICIENT |
|---|---|
| HEAD Head | 3.0 |
| BODY Body | 2.0 |
| RIGHT ARM Rarm | 1.2 |
| LEFT ARM Larm | 1.2 |
| RIGHT FOOT Rfoot | 0.8 |
| LEFT FOOT Lfoot | 0.8 |

NON-TRANSITORY COMPUTER READABLE MEDIUM, INFORMATION PROCESSING METHOD, AND GAME DEVICE USING HIT PROCESSING OF TARGET PARTS ON A TARGET OBJECT

CROSS REFERENCE TO RELATED APPLICATIONS

This application is a continuation application of International Application No. PCT/JP2019/044695, filed on Nov. 14, 2019, which claims priority to Japanese Patent Application No. 2018-223328, filed on Nov. 29, 2018, the entire contents of which are incorporated by reference herein.

BACKGROUND ART

Technical Field

The present invention relates to information processing programs, information processing methods, and game devices.

Action games of the type in which a player character and an enemy character are disposed in a virtual game space have hitherto been known. For example, Patent Literature 1 discloses an action game for which a controller that enables a player to perform operations is provided. In this action game, by operating the controller, it is possible to move the player character disposed in the game space or to perform an attack action for attacking the enemy character (target part).

In the action game disclosed in Patent Literature 1, in the case where an attack action is performed, a target area and the attacking direction are identified. Then, in the case where a plurality of enemy characters are included in the target area, priority ranks for being attacked are set in accordance with the attacking direction and the array order of the enemy characters. Collision determination for the individual enemy characters is executed according to the set priority ranks.

Furthermore, among conventional action games, there are games of the type in which an enemy character that is nearest to the player character within the target area is set as the target and an attack action is performed on the enemy character set as the target. There are also cases where the direction control in displaying the player character on a display is performed on the basis of the target.

CITATION LIST

Patent Literature

Patent Literature 1: JP 5758085 B

SUMMARY OF INVENTION

Technical Problem

In the case where a target is set in an action game, when the number of enemy characters included in a target area or the number of target parts that may serve as a target becomes large, there is a possibility that the array order of the enemy characters (target parts) or the enemy character (target part) nearest to the player character might be frequently switched. As a result, the target is switched frequently, which results in various demerits, such as giving stress to the player.

It is an object of the present invention to provide an information processing program, an information processing method, and a game device that make it possible to alleviate demerits that arise due to frequent switching of the target.

Solution to Problem

In order to solve the problem described above, an information processing program causes a computer to function as: a control unit that causes at least either of a player object and a target object disposed in a virtual game space to perform actions, the target object having a plurality of target parts set therein; an identifying unit that identifies the target parts included in a target area set for the player object; a target setting unit that sets a target, in the case where the plurality of target parts of the one target object are included in the target area, from among the plurality of target parts on the basis of the result of comparison of comparative values set or calculated for the individual target parts; and a processing unit that executes predetermined hit processing on the target part set as the target.

Furthermore, the plurality of target parts may have correction coefficients individually set therefor as the comparative values; the processing unit may calculate points on the basis of at least the correction coefficient of the target part set as the target in the hit processing, and may assign the points calculated in the hit processing to the target object or the target part; and the target setting unit may set the target part having the greatest or smallest correction coefficient as the target in the case where the plurality of target parts with which the correction coefficients vary are included in the target area.

Alternatively, the processing unit may calculate points to be assigned to the target part set as the target in the hit processing, and may assign the points calculated in the hit processing to the target object or the target part; and the target setting unit may set the target part with which the points become the greatest or least as the target in the case where the plurality of target parts are included in the target area.

In order to solve the problem described above, an information processing program causes a computer to function as: a control unit that causes at least either of a player object and a plurality of target objects disposed in a virtual game space to perform actions; an identifying unit that identifies the target objects included in a target area set for the player object; a target setting unit that, in the case where the plurality of target objects are included in the target area, sets a target object with which predetermined points to be assigned on a per-target-object basis become the greatest or least as a target; and a processing unit that executes hit processing for assigning the points to the target object set as the target.

Furthermore, the target setting unit may set the target when the target part or the target object is included in the target area.

Furthermore, the processing unit may execute the hit processing in the case where a predetermined hit operation is input; and the target setting unit may set the target when the hit operation is input.

In order to solve the problem described above, an information processing method includes: a step of causing at least either of a player object and a target object disposed in a virtual game space to perform actions, the target object having a plurality of target parts set therein; a step of identifying the target parts included in a target area set for the player object; a step of setting a target, in the case where the plurality of target parts of the one target object are included in the target area, from among the plurality of target parts on the basis of the result of comparison of comparative values set or calculated for the individual target parts; and a step of executing predetermined hit processing on the target part set as the target.

In order to solve the problem described above, a game device includes: a control unit that causes at least either of a player object and a target object disposed in a virtual game space to perform actions, the target object having a plurality of target parts set therein; an identifying unit that identifies the target parts included in a target area set for the player object; a target setting unit that sets a target, in the case where the plurality of target parts of the one target object are included in the target area, from among the plurality of target parts on the basis of the result of comparison of comparative values set or calculated for the individual target parts; and a processing unit that executes predetermined hit processing on the target part set as the target.

Effects of Disclosure

The present invention makes it possible to alleviate demerits that arise due to frequent switching of the target.

BRIEF DESCRIPTION OF DRAWINGS

FIG. 5 explains damage coefficients.

DESCRIPTION OF EMBODIMENTS

An aspect of an embodiment of the present invention will be described below in detail with reference to the accompanying drawings. The dimensions, materials, other specific values, etc. given in this embodiment are merely examples for facilitating understanding, and do not limit the present invention unless otherwise specifically mentioned. In this description and the drawings, the same reference signs are attached to elements having substantially the same functions and configurations, omitting repeated descriptions thereof, and elements that are not directly related to the present invention are not shown.

(Overall Configuration of Information Processing System S)

Figure 1:
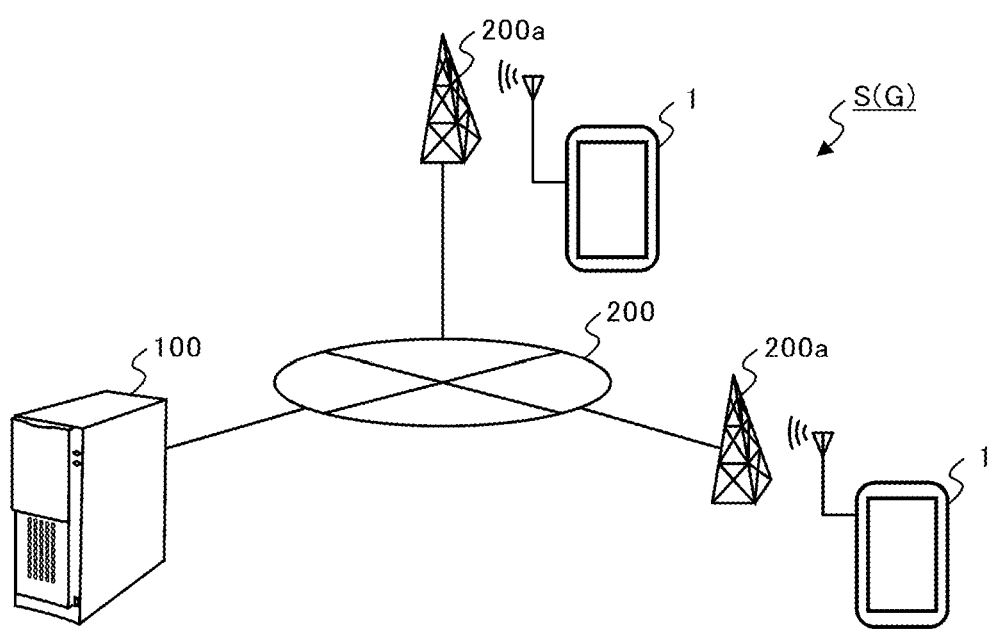
FIG. 1 is an illustration schematically showing the configuration of an information processing system.

FIG. 1 is an illustration schematically showing the configuration of an information processing system S. The information processing system S is what is called a client-server system, including player terminals 1, a server 100, and a communication network 200 having communication base stations 200a.

Each of the player terminals 1 can establish communication with the server 100 via the communication network 200. The player terminals 1 widely include electronic appliances that can be communicatively connected to the server 100 by wire or wirelessly. Examples of the player terminals 1 include mobile phones such as smartphones, tablet devices, personal computers, and game machines. This embodiment will be described in the context of the case where smartphones are used as the player terminals 1.

The server 100 is communicatively connected to the plurality of player terminals 1. The server 100 accumulates various kinds of information for each player who plays a game. Furthermore, the server 100 updates the accumulated information and controls the proceeding of the game on the basis of operations input from the player terminals 1.

The communication base stations 200a are connected to the communication network 200 and send information to and receive information from the player terminals 1 wirelessly. The communication network 200 is configured of a mobile phone network, the Internet, a local area network (LAN), a dedicated circuit, or the like, and realizes wired or wireless communicative connections between the player terminals 1 and the server 100.

In the information processing system S in this embodiment, a player terminal 1 and the server 100 function as a game device G. The player terminal 1 and the server 100 individually have assigned thereto roles for controlling the proceeding of the game such that it is possible to proceed with the game through cooperation between the player terminal 1 and the server 100.

(Hardware Configurations of Player Terminal 1 and Server 100)

Figure 2A:
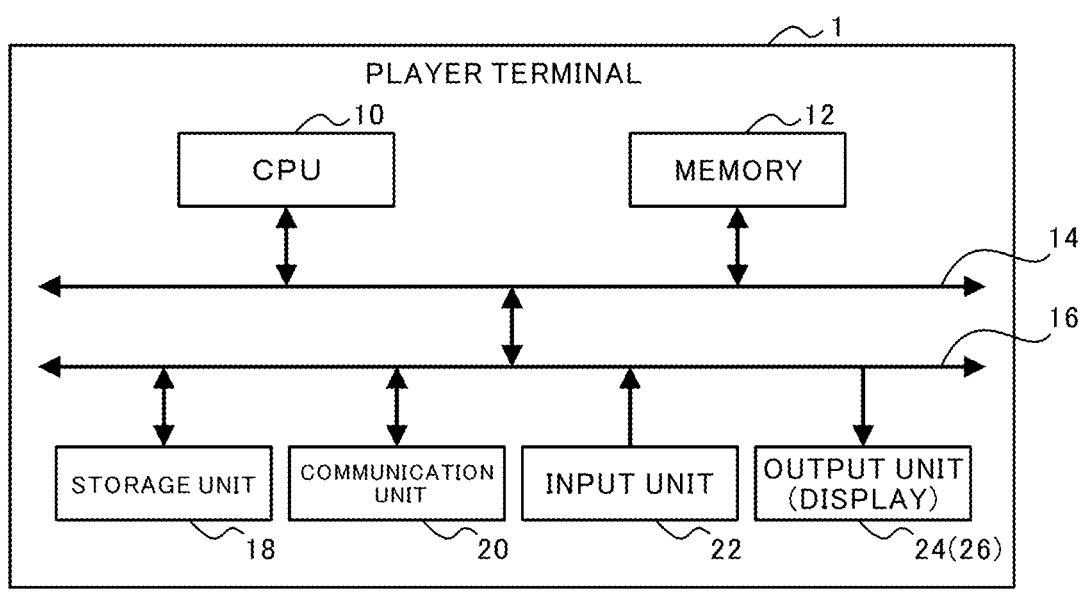
FIG. 2A explains the hardware configuration of a player terminal.
Figure 2B:
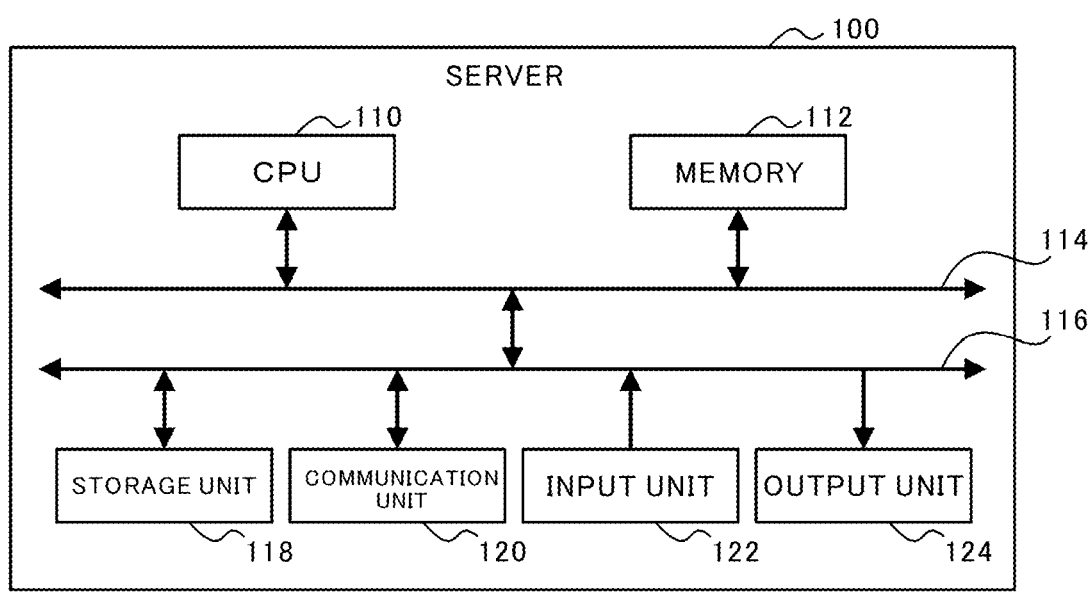
FIG. 2B explains the hardware configuration of a server.

FIG. 2A is a diagram for explaining the hardware configuration of the player terminal 1. Furthermore, FIG. 2B is a diagram for explaining the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

The configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24, respectively. Thus, a description of the hardware configuration of the player terminal 1 will be given below, and a description of the server 100 will be omitted.

The CPU 10 runs a program stored in the memory 12 to control the proceeding of the game. The memory 12 is configured of a read only memory (ROM) or a random access memory (RAM), and stores the program needed for controlling the proceeding of the game, as well as various kinds of data. The memory 12 is connected to the CPU 10 via the bus 14. Although it is assumed that the memory 12 is configured of a RAM in this embodiment, the memory 12 may be configured of a ROM or may be configured to include both a RAM and a ROM.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various kinds of programs and data. At the player terminal 1, the programs and data stored in the storage unit 18 are loaded into the memory 12 (RAM) by the CPU 10.

The communication unit 20 is communicatively connected to the communication base stations 200a wirelessly, and sends information to and receives information from the server 100 via the communication network 200, such as various kinds of data and programs. At the player terminal 1, the programs, etc. received from the server 100 are stored in the memory 12 or the storage unit 18.

The input unit 22 is configured of, for example, a touchscreen, buttons, a keyboard, a mouse, a cross key, or an analog controller with which player operations are input (operations are accepted). Alternatively, the input unit 22 may be a special controller provided in the player terminal 1 or connected (externally attached) to the player terminal 1. Yet alternatively, the input unit 22 may be configured of an acceleration sensor that detects tilting or movement of the player terminal 1 or a microphone that detects speech of the player. That is, the input unit 22 may widely include devices that enable the player to input his or her intents in distinguishable manners.

The output unit 24 is configured to include a display and a speaker. The output unit 24 may be a device connected (externally attached) to the player terminal 1. In this embodiment, the player terminal 1 is provided with a display 26 as the output unit 24 and is provided with a touchscreen as the input unit 22, wherein the touchscreen is overlaid on the display 26.

(Game Content)

Next, an example of the content of the game provided by the information processing system S (game device G) in this embodiment will be described. In this embodiment, what is called an action roll playing game (RPG) is provided. Specifically, in the game in this embodiment, a plurality of ally characters are provided. The player selects a plurality (four in this example) of ally characters from the provided ally characters to organize a party. Furthermore, the player sets one of the ally characters organized into the party as an operable character (a player object, hereinafter referred to as a "player character PC"), which can be operated by the player himself or herself.

Figure 3A:
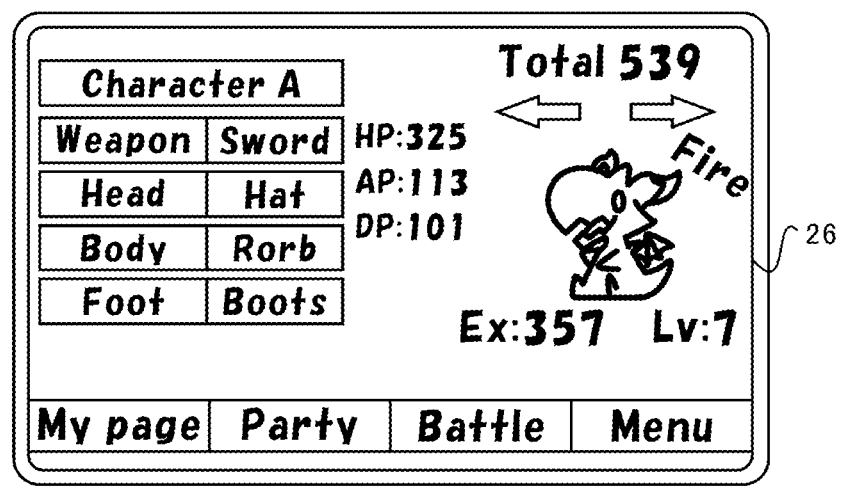
FIG. 3A shows an example of a party organizing screen for organizing a party.

FIG. 3A shows an example of a party organizing screen for organizing a party. For each ally character, an experience value Ex and a level Lv are stored in association therewith. The experience value Ex is raised in the case where a battle game has been won, which will be described later, or in the case where a predetermined item has been used. The level Lv is set in accordance with the experience value Ex, and the level Lv is raised each time the experience value Ex reaches a predetermined value. Note that each ally character has set therefor an upper limit value of the level Lv, and the level Lv is raised only within the range defined by the upper limit value.

Furthermore, each ally character has set therefor, in accordance with the level Lv, base values of battle abilities such as life points HP, an attacking power AP, and a defending power DP. The player can proceed with the game more advantageously as the battle abilities of ally characters become higher. Furthermore, the base values set for ally characters are raised as the levels Lv thereof become higher.

Furthermore, in the party organizing screen, the player can equip the ally characters organized into the party with equipment such as weapons and protectors (set such equipment for the ally characters). Each of the items of equipment has set therefor additional values for the attacking power AP, the defending power DP, etc. When the ally characters are equipped with such equipment, the additional values of the individual items of equipment are added to the base values mentioned above, which makes it possible to enhance the battle abilities of the ally characters.

Note that each ally character has an attribute set therefor in advance. In this embodiment, three kinds of attributes, namely, "fire", "wind", and "water", are provided, and all the ally characters have set therefor one of the three attributes.

The player can utilize the party organized as described above in the battle game. The object of a battle game is to win the game by beating enemy characters with the ally characters organized into the party. In the battle game, the player operates the input unit 22 of the player terminal 1 so as to cause the player character PC to perform a movement action or an attack action.

Furthermore, the ally characters other than the player character PC are caused to perform movement actions or attack actions under computer control or by other players. When an attack action is performed, damage points are assigned to an enemy character, and the damage points are subtracted from the life points HP of the enemy character. The enemy character vanishes when the life points HP thereof become 0.

Figure 3B:
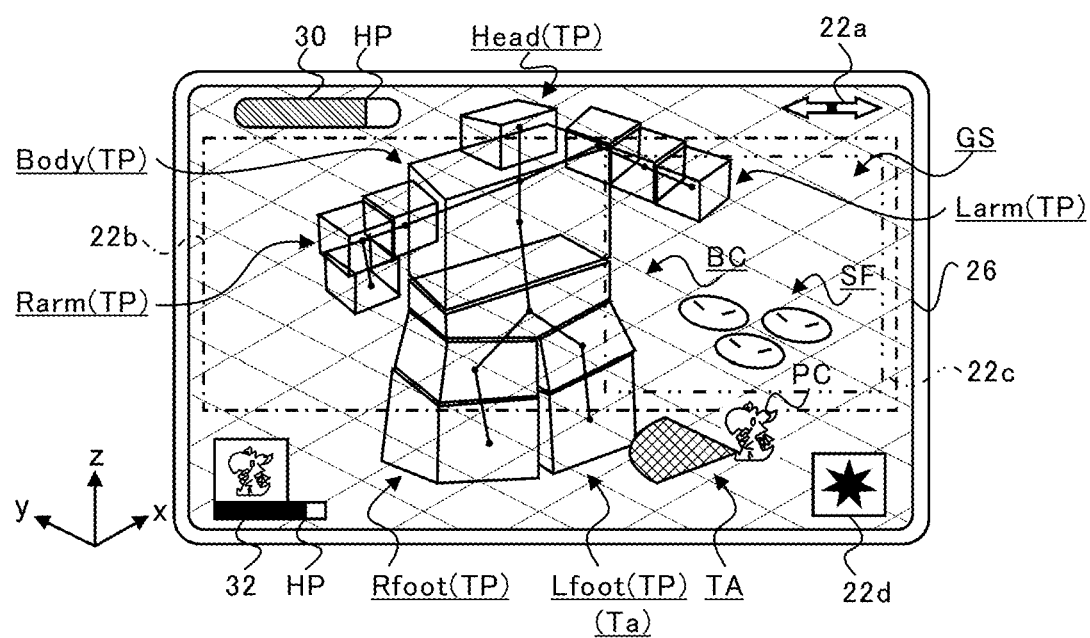
FIG. 3B explains an example of a battle game.

FIG. 3B is an illustration for explaining an example of the battle game. Although a detailed description will be omitted, the player can select and play one of a plurality of battle games. When the player has selected a battle game, the party organizing screen shown in FIG. 3A is displayed. The battle game is started when the player finishes organizing a party on the party organizing screen and performs a predetermined battle starting operation.

In the battle game, as shown in FIG. 3B, a virtual game space GS is displayed. In the game space GS, ally characters including the player character PC and enemy characters are provided. Note that in FIG. 3B, only the player character PC is shown among the ally characters, and the ally characters other than the player character PC are omitted. Furthermore, a plurality of battle games are provided, including battle games in which only a boss character BC (target object) is provided as an enemy character and battle games in which mob characters SF are included in addition to the boss character BC.

At the player terminal 1, image processing for generating the game space GS and characters (including ally characters and enemy characters) and displaying the game space GS and the characters on the display 26 is executed. For example, the player terminal 1 reads out various kinds of data and generates a three-dimensional virtual game space GS. Then, a two-dimensional image of the generated game space GS as virtually viewed, captured by means of a virtual camera from a predetermined viewpoint, is generated. This two-dimensional image is displayed on the display 26. In this embodiment, the game space GS includes both the three-dimensional data generated in the process of image processing and the two-dimensional image displayed on the display 26.

In the game space GS, three-axis position information based on an x axis, a y axis, and a z axis shown in FIG. 3B is defined, and character actions are controlled on the basis of this position information. Furthermore, a boss-character life meter 30 and a player-character life meter 32 are displayed in a superimposed manner on the game space GS on the display 26.

The boss-character life meter 30 displays the life points HP of the boss character BC in the form of a meter. The life points HP of the boss character BC are decreased with attacks by the ally characters. In the battle game, the player wins when the life points HP of the boss character BC become 0.

Furthermore, the player-character life meter 32 displays the life points HP of the player character PC in the form of a meter. The life points HP of the player character PC are decreased with attacks by enemy characters. Note that the display 26 may display the life points HP of the ally characters organized into the party other than the player character PC. In the battle game, the player is defeated when the life points HP of the player character PC or the life points HP of all the ally characters become 0.

Furthermore, during the battle game, an angle operation section 22a, a movement operation section 22b, a normal-attack operation section 22c, and a special-attack operation section 22d are provided as the input unit 22 of the player terminal 1. That is, the input unit 22 in this embodiment is configured of a touchscreen, and the angle operation section 22a, the movement operation section 22b, the normal-attack operation section 22c, and the special-attack operation section 22d are provided at different positions on the touchscreen during the battle game.

The angle operation section 22a is provided in an upper right region of the display 26 disposed in the landscape orientation. The angle operation section 22a accepts an operation for changing the angle of the game space GS displayed on the display 26. For example, when a slide operation is performed so as to slide a player's finger in the horizontal direction in the angle operation section 22a, the angle of the game space GS displayed on the display 26 is changed in accordance with the direction of the operation.

The movement operation section 22b is provided substantially over the entire width of the display 26 disposed in the landscape orientation, as indicated by a single-dotted chain line in FIG. 3B. The movement operation section 22b accepts an operation for performing an action of moving the player character PC (hereinafter referred to as a "movement operation"); for example, the movement operation section 22b detects a slide operation (swipe) with a player's finger as a movement operation. When a movement operation is input to the movement operation section 22b, the player character PC is moved in the direction of the movement operation.

The normal-attack operation section 22c is provided in the right half of the display 26 disposed in the landscape orientation, as indicated by a double-dotted chain line in FIG. 3B. Note that the normal-attack operation section 22c is provided inside the movement operation section 22b here. That is, the movement operation section 22b and the normal-attack operation section 22c partially overlap each other. Alternatively, however, the movement operation section 22b and the normal-attack operation section 22c may be disposed at entirely different positions. For example, the movement operation section 22b may be provided in the left half of the display 26.

Here, in this embodiment, normal attack actions and special attack actions are provided as attack actions of the player character PC for attacking an enemy character. A normal attack action is an action for attacking an enemy character with a weapon that the player character PC is equipped with. Meanwhile, a special attack action is an action for attacking an enemy character with a skill (special ability) preset in the player character PC. It is possible to assign greater damage points with the special attack action than with the normal attack action.

The normal-attack operation section 22c accepts an operation for causing the player character PC to perform a normal attack action (hereinafter referred to as a "normal attack operation"); for example, the normal-attack operation section 22c detects a player's finger being brought into contact or proximity (tap) therewith as a normal attack operation. When a normal attack operation is input to the normal-attack operation section 22c, the player character PC performs a normal attack action on an enemy character.

The special-attack operation section 22d is provided in a lower right region of the display 26 disposed in the landscape orientation. The special-attack operation section 22d accepts an operation for causing the player character PC to perform a special attack action (hereinafter referred to as a "special attack operation"); for example, the special-attack operation section 22d detects a player's finger being brought into contact or proximity (tap) therewith as a special attack operation.

When a special attack operation is input to the special-attack operation section 22d, the player character PC performs a special attack action on an enemy character. Note that special attack operations are effective only in the case where a preset condition is satisfied; for example, special attack operations are enabled only at predetermined intervals. In the following, normal attack actions and special attack actions will be collectively referred to as attack actions. Furthermore, normal attack operations and special attack operations will be collectively referred to as attack operations.

An attack operation by the player character PC is performed on one of the enemy characters disposed in the game space GS as a target Ta. That is, in the case where a plurality of enemy characters are present in the game space GS, one of the enemy characters is set as the target Ta. When an attack operation is input, an attack action is performed on the enemy character set as the target Ta.

As will be described later in detail, a target area TA is set for the player character PC, as indicated by cross hatching in FIG. 3B. An enemy character included in this target area TA is set as the target Ta. In the case where no enemy character is included in the target area TA, the target Ta is not set.

Furthermore, since the boss character BC is larger (occupies a greater area) compared with mob characters SF and the player character PC, a plurality of target parts TP are set. Thus, the target Ta is set on the basis of the individual target parts TP for the boss character BC. Specifically, with the boss character BC shown in FIG. 3B, six target parts TP are set, namely, the head Head, the body Body, the right arm Rarm, the left arm Larm, the right foot Rfoot, and the left foot Lfoot, and one of these is set as the target Ta. FIG. 3B shows a state in which the left foot Lfoot is set as the target Ta.

Here, in the state where it is possible to operate the player character PC during the battle game, setting of the target Ta is constantly being performed. At the player terminal 1, the position where the player character PC is displayed is identified on the basis of the position information of the player character PC. Furthermore, the orientation (direction) of the player character PC is identified on the basis of the position information of a target part TP or an enemy character set as the target Ta. That is, setting of the target Ta is constantly being performed in order to identify the direction in which the displayed player character PC should face. Note that the target Ta is not set in the case where neither a target part TP nor an enemy character is preset in the vicinity of the player character PC. In the case where the target Ta is not set, the orientation of the player character PC is identified on the basis of the moving direction.

Furthermore, in this embodiment, the target Ta is reset at the time of an attack operation, and the attack operation is performed on the reset target Ta. Note that constantly performed setting of the target Ta and the setting of the target Ta at the time of an attack operation are performed under the same conditions (by the same module). Thus, the target Ta that is set at the time of an attack operation becomes the same as the target Ta constantly being set. Accordingly, at the time of an attack operation, an attack action may be performed on the already set target Ta without having to reset the target Ta.

Note that the target Ta is set on the basis of the positions and kinds of enemy characters that are preset around the player character PC. The following describes a method of setting the target Ta in the case where only the player character PC and the boss character BC having a plurality of target parts TP set therein are present in the game space GS.

Figure 4A:
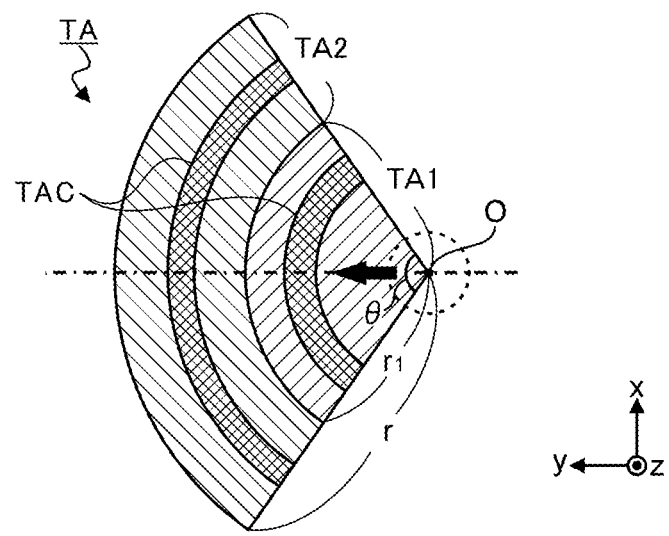
FIG. 4A shows a target area as viewed from the front in a Z axis direction.
Figure 4B:
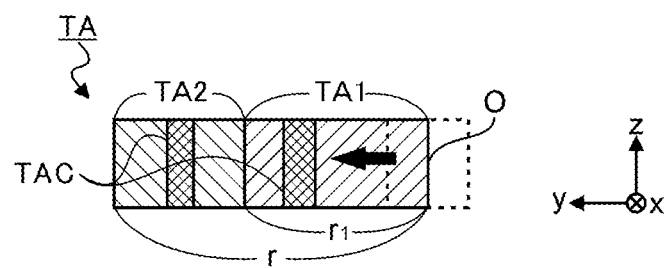
FIG. 4B shows the target area as viewed in an X axis direction.

FIG. 4A shows the target area TA as viewed from the front in the Z axis direction, and FIG. 4B shows the target area TA as viewed in the X axis direction. In FIGS. 4A and 4B, the reference sign O indicates the position of the player character PC, and the black-painted arrow indicates the direction in which the player character PC is facing. The region centered at the position O and surrounded by a broken line indicates the range in which the player character PC is displayed. The range indicated by hatching and cross hatching in FIGS. 4A and 4B serves as the target area TA.

As shown in FIG. 4A, the target area TA is set so as to have a fan shape on the xy plane and centered at the position O of the player character PC. At this time, the target area TA is set in left-right symmetry with respect to the orientation of the player character PC (indicated by a single-dotted chain line in FIG. 4A) as the center line. The radius r and the angle θ of the target area TA vary depending on the weapon that the player character PC is equipped with. That is, the target area TA is set on a per-weapon basis in advance, and is set according to the position and orientation of the player character PC, as well as the weapon that the player character PC is equipped with.

Furthermore, as shown in FIG. 4B, the range of the target area TA is also set in the z axis direction. Here, it is assumed that the range of the target area TA in the z axis direction is constant and is equal to the height of the player character PC displayed. Alternatively, the range of the target area TA in the z axis direction may be set so as to vary depending on the distance of the player character PC from the position O or the angle θ.

Furthermore, the target area TA may be set so as to have a circular shape at a position separated by a certain distance from the player character PC or at the position O centered at the player character PC. Furthermore, although the target area TA here varies depending on the weapon that the player character PC is equipped with, for example, the target area TA may be set for each player character PC irrespective of the weapon. Alternatively, the target area TA may be set depending on the combination of the player character PC and the weapon. Alternatively, the target area TA may be set at a certain range irrespective of the player character PC or the weapon.

Furthermore, in this embodiment, a common target area TA is set irrespective of the kind of attack action (attack operation). Alternatively, however, for example, the setting of the target area TA may be varied between normal attack actions and special attack actions. Furthermore, although the case where the target area TA is set for the player character PC has been described here, the target area TA is set for each of the ally characters organized into the party. Furthermore, although a detailed description will be omitted, a predetermined target area TA is also set for the boss character BC similarly to the player character PC.

Here, there are cases, depending on the kind of weapon that the player character PC is equipped with, where the target area TA is divided into a first area TA1 and a second area TA2. For example, in the case where the weapon that the player character PC is equipped with is a "sword", a first area TA1 and a second area TA2 are set in the target area TA. The first area TA1 is the range of a radius $r_1$ from the position O, and the second area TA2 is the range that is remoter than the first area TA1 from the position O in the direction of the radius r.

As normal attack actions with the "sword", standing attack actions and flying attack actions are provided. A standing attack action is an action in which the player character PC swings the "sword" on the spot without moving from the position O. Meanwhile, a flying attack action is an action in which the player character PC flies ahead from the position O and attempts to slay an enemy.

The player character PC performs a standing attack action in the case where the target Ta is set in the first area TA1, and the player character PC performs a flying attack action in the case where the target Ta is set in the second area TA2. That is, the first area TA1 and the second area TA2 are set in order to switch the mode of a normal attack action by the player character PC.

Note that in this embodiment, there is no difference in the damage points assigned to an enemy character between a standing attack action and a flying attack action. Alternatively, the damage points assigned to an enemy character may be varied between a standing attack action and a flying attack action.

Furthermore, as indicated by cross hatching in FIGS. 4A and 4B, a critical range TAC is set in the target area TA. Furthermore, in the case where a first area TA1 and a second area TA2 are set in the target area TA, a critical range TAC is set in each of the first area TA1 and the second area TA2. The critical range TAC is a range in which the damage points assigned to an enemy character become greater.

Note that the critical range TAC may be provided in just one of the first area TA1 and the second area TA2, or may be provided so as to extend across the first area TA1 and the second area TA2. Furthermore, although the critical range TAC here varies depending on the weapon that the player character PC is equipped with, for example, the critical range TAC may be set for each player character PC irrespective of the weapon. Alternatively, the critical range TAC may be set depending on the combination of the player character PC and the weapon.

FIG. 5 explains damage coefficients. As described earlier, a target part TP included in the target area TA is set as the target Ta. For example, in the case where only one target part TP of the boss character BC is included in the target area TA, the single target part TP is set as the target Ta. Meanwhile, in the case where a plurality of target parts TP of the boss character BC are included in the target area TA, one of those target parts TP is set as the target Ta.

Here, damage coefficients (correction coefficients) are set individually for the plurality of target parts TP of the boss character BC. As will be described later in detail, when an attack operation is performed, attack determination processing for determining whether or not the attack by the player character PC hits a target part TP is executed. When the attack determination processing results in a hit determination, the damage points to be assigned to the target part TP are calculated.

The damage points are calculated on the basis of various parameters, such as the attacking power and attributes of the player character PC. At this time, the damage points calculated on the basis of the parameters other than the damage coefficient are multiplied by the damage coefficient of the target part TP set as the target Ta, whereby the final damage points are calculated.

That is, a damage coefficient is a parameter for computing the damage points to be assigned to a target part TP. In other words, damage points are assigned to a target part TP set as the target Ta on the basis of the damage coefficient of that target part TP.

For example, as shown in FIG. 5, 3.0 is preset as the damage coefficient for the head Head. Similarly, damage coefficients are set individually as follows: 2.0 for the body Body, 1.2 for the right arm Rarm and the left arm Larm, and 0.8 for the right foot Rfoot and the left foot Lfoot. Suppose that the damage points are calculated as 100 on the basis of the parameters other than the damage coefficient. In this case, if the head Head is set as the target Ta, the damage points to be assigned to the boss character BC are calculated as 100×3.0=300. Meanwhile, if the left foot Lfoot is set as the target Ta, the damage points to be assigned to the boss character BC are calculated as 100×0.8=80.

In the battle game, the calculated damage points are subtracted from the life points HP of the boss character BC. Thus, it becomes more advantageous for the player as the damage points become greater. Therefore, here, performing an attack action in which the head Head is set as the target Ta is more advantageous for the player than performing an attack action in which one of the other target parts TP is set as the target Ta.

Figure 6A:
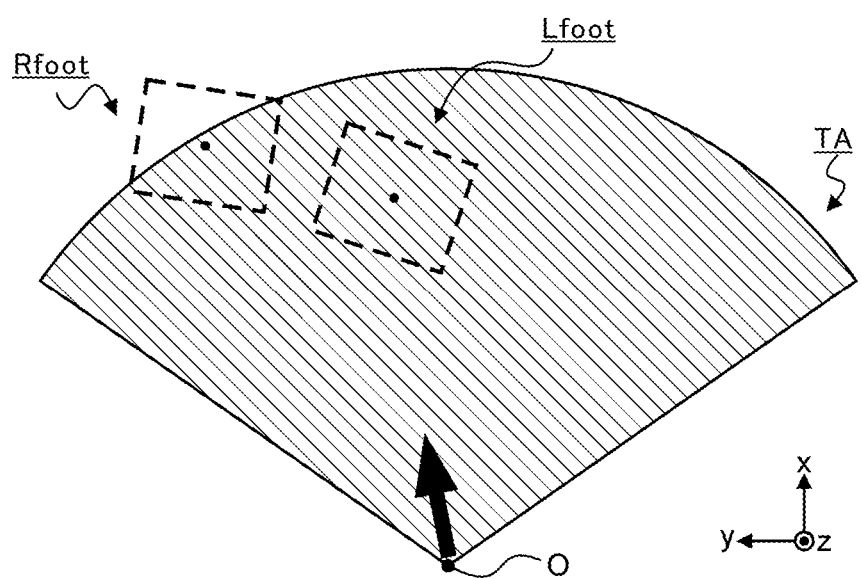
FIG. 6A explains an example of target setting.
Figure 6B:
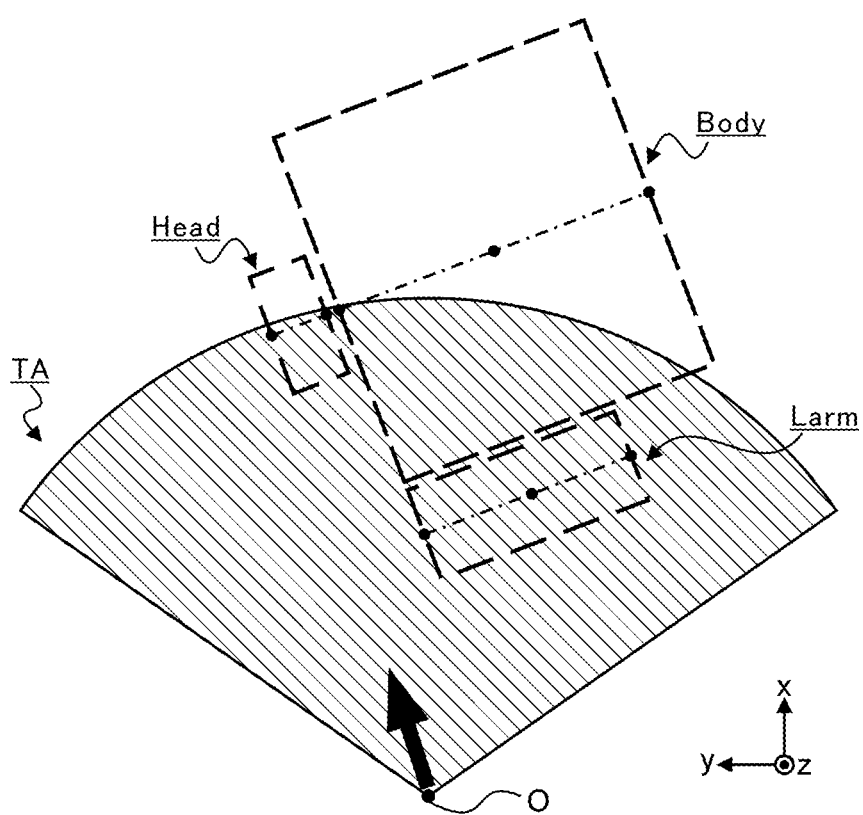
FIG. 6B explains another example of target setting.

FIG. 6A illustrates an example of the setting of the target Ta. FIG. 6B illustrates another example of the setting of the target Ta. In FIGS. 6A and 6B, the target area TA as viewed from the z axis direction is indicated by hatching, and the target parts TP are indicated as surrounded by broken lines. FIG. 6A shows a state in which the boss character BC is standing, and FIG. 6B shows a state in which the boss character BC has fallen.

In the state where the boss character BC is standing, the target parts TP other than the right foot Rfoot and the left foot Lfoot are located above the target area TA in the z axis direction of the game space GS. That is, in the state where the boss character BC is standing, the head Head, etc. having large damage coefficients are not included in the target area TA. Thus, the player first performs attack operations on the right foot Rfoot and the left foot Lfoot of the boss character BC.

Then, when a certain damage has been given to the right foot Rfoot and the left foot Lfoot, the boss character BC falls onto the ground, as shown in FIG. 6B. In this state, the head Head, etc. are included in the target area TA, which enables attack operations on target parts TP having large damage coefficients.

In the target parts TP, a plurality of joint sections (indicated by black dots in FIGS. 6A and 6B) and bone sections (indicated by single-dotted chain lines in FIG. 6B) interconnecting the joint sections are set in advance. The tilt of a bone section with respect to the z axis direction, i.e., the posture and orientation of a target part TP, changes depending on the relative position of joint sections.

Furthermore, a certain range centered at and around a bone section becomes a target part TP, i.e., a range in which a target part TP is displayed, which becomes a collision range in which an attack hits. In this embodiment, in the case where it is said that a target part TP is included in the target area TA, that means that at least a portion of the target part TP (collision range) is included in the target area TA. That is, it is determined here whether or not at least a portion of a target part TP is included in the target area TA. Alternatively, however, it may be determined whether or not the entirety of a target part TP is included in the target area TA, or it may be determined whether or not a joint section or a bone section of a target part TP is included in the target area TA.

For example, suppose that two target parts TP, namely, the right foot Rfoot and the left foot Lfoot, are included in the target area TA, as shown in FIG. 6A. The damage coefficients of the right foot Rfoot and the left foot Lfoot are equally 0.8. In the case where only a plurality of target parts TP having equal damage coefficients are included in the target area TA, as described above, the separating distances from the position O of the player character PC are compared with each other, and the nearest target part TP (having the smallest separating distance) is set as the target Ta.

Note that the separating distance is calculated in terms of the distance between a portion nearest to the player character PC (the position O) in a target part TP and the position O. Alternatively, however, the separating distance may be calculated in terms of the distance from the player character PC (the position O) to a joint section or a bone section of a target part TP. In this case, the separating distance may be calculated in consideration of the position along the z axis direction; for example, the separating distance may be calculated in terms of the distance on the xy plane at a predetermined position along the z axis direction.

In the example shown in FIG. 6A, the left foot Lfoot is closer to the player character PC than the right foot Rfoot. Thus, in this example, the left foot Lfoot is set as the target Ta. Since the left foot Lfoot is set as the target Ta, as described above, the player character PC is displayed so as to face the left foot Lfoot, as indicated by the black-painted arrow in FIG. 6A. Furthermore, in the case where an attack operation is input in this state, an attack action on the left foot Lfoot is performed.

Meanwhile, suppose that three target parts TP, namely, the head Head, the body Body, and the left arm Larm, are included in the target area TA, as shown in FIG. 6B. The damage coefficients of the head Head, the body Body, and the left arm Larm are 3.0, 2.0, and 1.2, respectively. In the case where a plurality of target parts TP having different damage coefficients are included in the target area TA, as described above, the target part TP having the greatest damage coefficient, irrespective of the separating distance from the position O of the player character PC, is set as the target Ta.

Thus, in this case, the head Head is set as the target Ta. Since the head Head is set as the target Ta, as described above, the player character PC is displayed so as to face the head Head, as indicated by the black-painted arrow in FIG. 6B. Furthermore, in the case where an attack operation is input in this state, an attack action on the head Head is performed.

As described above, according to this embodiment, in the case where a plurality of target parts TP are included in the target area TA, the target Ta is set on the basis of damage coefficients. The player character PC is controlled to be displayed so as to face the target part TP set as the target Ta. When an attack operation is input, an attack action is performed on the target part TP set as the target Ta.

Conventionally, in the case where a plurality of target parts TP are included in the target area TA, there are cases where the target part TP nearest to the player character PC is set as the target Ta. However, depending on the mode of action between the player character PC and the boss character BC, the target part TP nearest to the player character PC frequently changes. In this case, the target Ta is switched frequently during a short period.

When the target Ta is switched frequently, the orientation of the player character PC is frequently switched, which makes the behavior of the player character PC displayed on the display 26 unstable. Furthermore, for example, it might be stressful for the player if the target of an attack is frequently switched even though the position of the player character PC is not substantially changed.

In this embodiment, since the target Ta is set on the basis of damage coefficients in a battle against the boss character BC, it is possible to moderate the frequency of switching of the target Ta. This stabilizes the display of the player character PC. Furthermore, an attack action tends to be performed continuously and concentratedly on a certain target part TP, which serves to reduce the stress felt by the player. That is, according to this embodiment, the demerit associated with frequent switching of the target Ta is eliminated.

Furthermore, in this embodiment, a movement operation of the player character PC is input via the movement operation section 22b provided on the display 26. The movement operation section 22b is not so easy to operate compared with, for example, a controller dedicated to games, which makes delicate operations difficult. Thus, compared with conventional game machines, it is more difficult to control the position of the player character PC, which makes it difficult to concentratedly aim at a target part TP with which the greatest damage points can be assigned. According to this embodiment, since a target part TP having the greatest damage coefficient is set as the target Ta, it is possible to realize attack actions matching player's intents even in the case where the ease of operation is low.

Furthermore, for example, it is also possible to design a system in which, in the case where a plurality of target parts TP are included in the target area TA, a target part TP having a small damage coefficient is set as the target Ta. In this case, by providing a battle game in which a target part TP having a large damage coefficient is set as the target Ta and a battle game in which a target part TP having a small damage coefficient is set as the target Ta, it is possible to readily design battle games having different levels of difficulty.

Furthermore, for example, in the case where the player character PC is attacked by an enemy character, there are cases where the player character PC enters an abnormal state from a normal state. A target part TP having a small damage coefficient may be set as the target Ta in such an abnormal state of the player character PC.

Furthermore, the target part TP that is set as the target Ta may be switched depending on the attributes of the ally characters. For example, a target part TP having a small damage coefficient is set as the target Ta with an ally character having the attribute "fire", and a target part TP having a large damage coefficient is set as the target Ta with an ally character having the attribute "water".

Furthermore, for example, for the head Head serving as a target part TP, different damage coefficients (correction coefficients) may be set for the attribute "fire" and the attribute "water". That is, damage coefficients (correction coefficients) may vary depending on the combinations of a target part TP and an attribute. In this case, different target parts TP may be set as the target Ta depending on the attributes of the ally characters. In the case where different target parts TP may be set as the target Ta depending on attributes, as described above, the advantage in the battle game considerably varies depending on the ally characters organized into the party, which requires the player to have a more sophisticated strategy.

Furthermore, here, damage points calculated on the basis of parameters other than a damage coefficient (base damage points) are multiplied by the damage coefficient to calculate the final damage points. Thus, as the value of the damage coefficient becomes greater, the damage points that are assigned to a target part TP become greater. Alternatively, however, a damage coefficient may be used to calculate a subtracted value to be subtracted from the base damage points. Specifically, a subtracted value calculated by multiplying the base damage points by a damage coefficient is subtracted from the base damage points to calculate the final damage points.

As an example, if the base damage points are 100 and the damage coefficient is 0.1, the subtracted value is calculated as 100×0.1=10. Thus, the final damage points in this case are 100−10=90. As another example, if the base damage points are 100 and the damage coefficient is 0.5, the subtracted value is calculated as 100×0.5=50. Thus, the final damage points in this case are 100−50=50. As described above, damage coefficients may be provided as coefficients for decreasing damage points. In this case, as the damage coefficient becomes greater, the damage points assigned to an enemy character are reduced.

Next, the functional configuration and processing for executing the battle game described above will be described. Here, descriptions of the basic configuration and processing for proceeding with the game, as well as configurations and processing that are irrelevant to the battle game, will be omitted. Furthermore, the following describes a solo-play, in which a player plays the game alone, and a description of a multi-play, in which the game is played by a plurality of players, will be omitted. Furthermore, descriptions of ally characters other than the player character PC, as well as enemy characters other than the boss character BC, will also be omitted.

Figure 7:
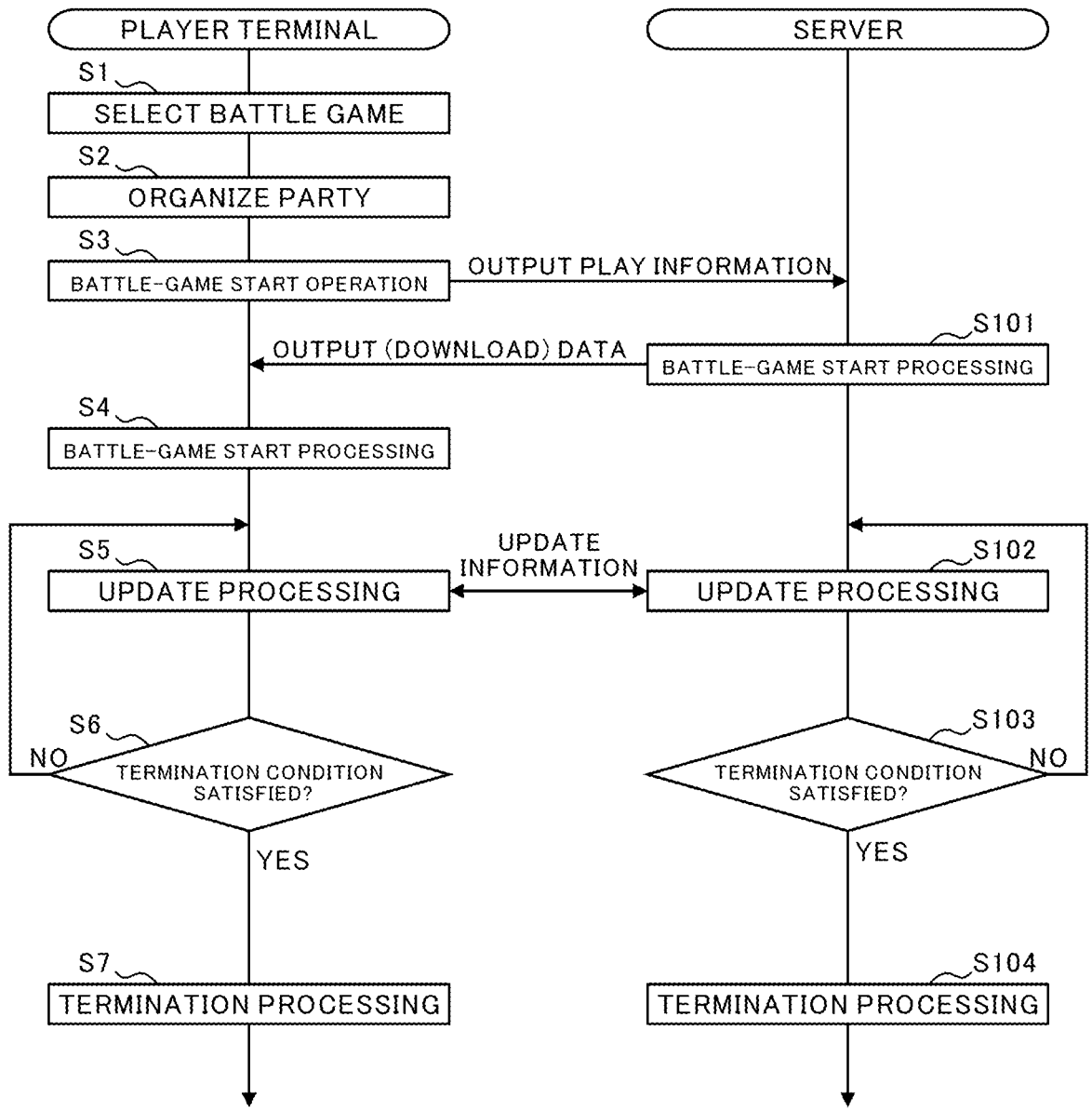
FIG. 7 explains the flow of processing at the player terminal and the server during the execution of a battle game.

FIG. 7 explains the flow of processing by the player terminal 1 and the server 100 during the execution of a battle game. When the game application is activated on the player terminal 1, a menu screen is displayed on the display 26. The player can select a battle game from among a plurality of battle games on the menu screen (S1). When a battle game has been selected, a party organizing screen is displayed, which enables various kinds of setting for ally characters (S2). After the organization of a party is finished, when the player performs a battle start operation, play information is output to the server 100 (S3).

Here, as the play information, various kinds of information needed in the battle game, such as the kind of battle game selected by the player, the ally characters organized into the party, the player character PC, and items of equipment, are output.

At the server 100, in response to the input of the play information, battle-game start processing needed for starting the battle game is executed (S101). Here, for example, an area of the memory 112 for proceeding with the battle game is allocated, the play information input from the player terminal 1 is stored, and a predetermined program is loaded from the storage unit 118 into the memory 112. Furthermore, the server 100 outputs predetermined data to the player terminal 1 and allows the player terminal 1 to download data.

Then, battle-game start processing needed for starting the battle game is also executed at the player terminal 1 (S4). Here, for example, an area of the memory 12 for proceeding with the battle game is allocated, the play information is stored, and a program and image data downloaded from the server 100 are stored in the memory 12. Alternatively, the program, etc. needed for the battle game may be loaded from the storage unit 18 into the memory 12.

When the preparations for the battle game are finished, as described above, terminal-side battle-game control processing at the player terminal 1 and server-side battle-game control processing at the server 100 are executed concurrently. In the terminal-side battle-game control processing and the server-side battle-game control processing, update processing for updating various kinds of information is executed (S5 and S102). This update processing is repeatedly executed on a per-frame basis until a condition for terminating the battle game is satisfied (NO in S6 and S103).

Note that the number of frames is not particularly limited; for example, the number of frames per second is 30 to 60. Thus, during the battle game, information is updated at intervals of about 16 ms to 33 ms at the player terminal 1 and the server 100. Furthermore, in the update processing, update information is sent and received between the player terminal 1 and the server 100. Then, when the condition for terminating the battle game is satisfied (YES in S6 and S103), termination processing for terminating the terminal-side battle-game control processing and the server-side battle-game control processing is executed (S7 and S104). Note that although the update processing is executed and update information is sent and received on a per-frame basis here, the update processing may be executed and the update information may be sent and received at intervals shorter or longer than a per-frame basis.

Figure 8:
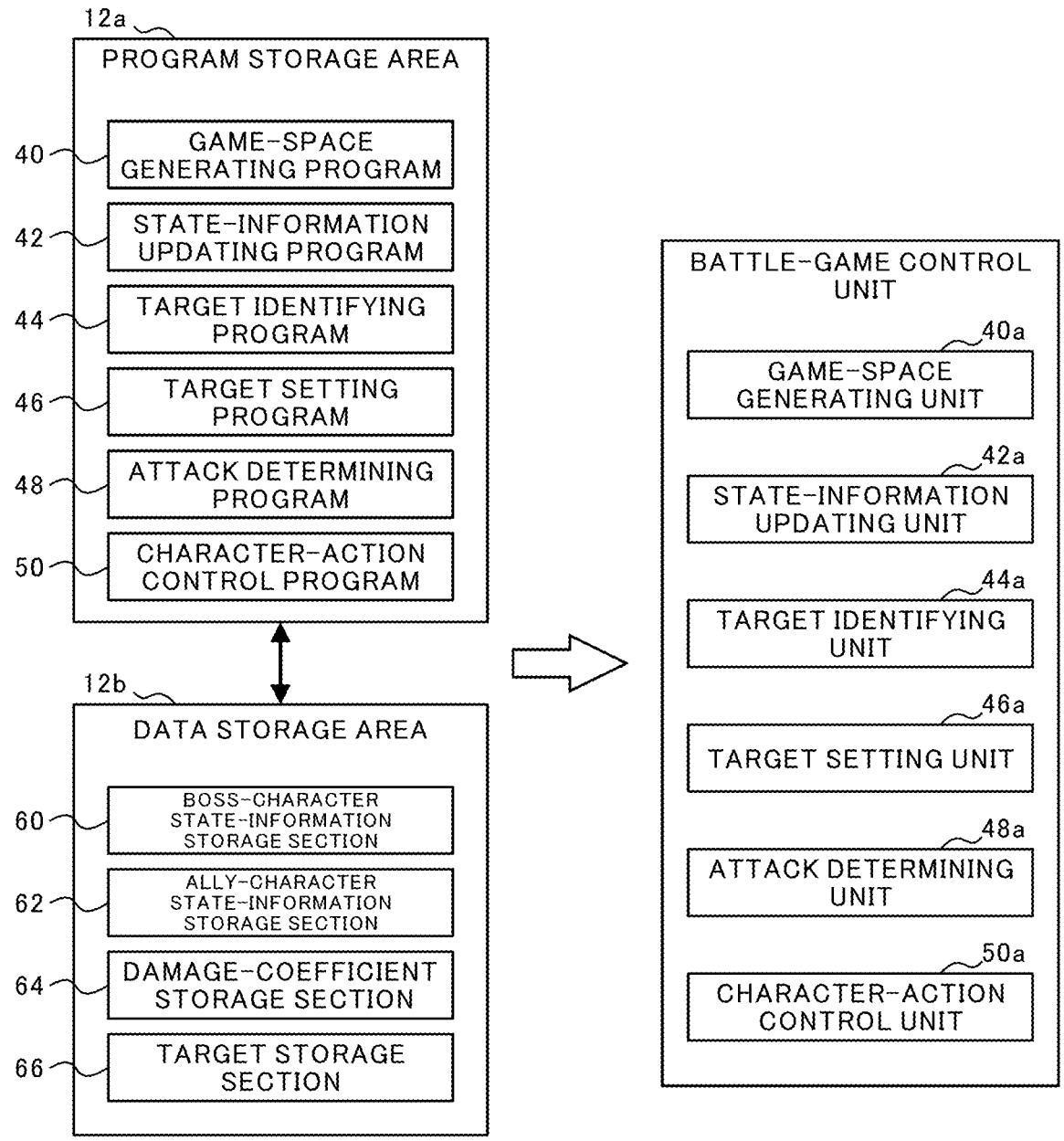
FIG. 8 explains the configuration of a memory and the functions of a computer at the player terminal.

FIG. 8 is a diagram for explaining the configuration of the memory 12 and the functions of a computer at the player terminal 1. In the memory 12, a program storage area 12a and a data storage area 12b are provided. When a battle game is started, the CPU 10 stores programs (modules) for the terminal-side battle-game control processing in the program storage area 12a.

The programs for the terminal-side battle-game control processing include a game-space generating program 40, a state-information updating program 42, a target identifying program 44, a target setting program 46, an attack determining program 48, and a character-action control program 50. Note that the programs listed in FIG. 8 are examples, and a large number of other programs are also provided in the programs for the terminal-side battle-game control processing.

In the data storage area 12b, as storage sections for storing data, a boss-character state-information storage section 60, an ally-character state-information storage section 62, a damage-coefficient storage section 64, and a target storage section 66 are provided. Note that these storage sections are examples, and a large number of other storage sections are provided in the data storage area 12b.

The CPU 10 runs the individual programs stored in the program storage area 12a and updates the data in the individual storage sections of the data storage area 12b. Furthermore, the CPU 10 runs the individual programs stored in the program storage area 12a, thereby causing the player terminal 1 (computer) to function as a battle-game control unit.

Specifically, the CPU 10 runs the game-space generating program 40, thereby causing the computer to function as a game-space generating unit 40a. Similarly, the CPU 10 runs the state-information updating program 42, the target identifying program 44, the target setting program 46, the attack determining program 48, and the character-action control program 50, thereby causing the computer to function as a state-information updating unit 42a, a target identifying unit 44a, a target setting unit 46a, an attack determining unit 48a, and a character-action control unit 50a, respectively.

The game-space generating unit 40a generates a game space GS and displays the game space GS on the display 26.

The state-information updating unit 42a updates state information indicating the states of the boss character BC (enemy character) and the ally characters (player character PC).

The state-information updating unit 42a updates the state information in the boss-character state-information storage section 60 on the basis of update information output from the server 100. The state information of the boss character BC includes the positions along the x, y, and z axis directions, the posture (tilt), the orientation, an action (information concerning an action being performed, etc.), and the collision range of each of the target parts TP.

Furthermore, the state-information updating unit 42a updates the state information in the ally-character state-information storage section 62. The state information of the ally characters includes the positions along the x, y, and z axis directions, the posture (tilt), the orientation, an action (information concerning an action being performed, etc.), and equipped weapon information of each of the ally characters organized into the party. The state-information updating unit 42a updates the state information of the player character PC mainly on the basis of movement operations and attack operations input from the input unit 22. Furthermore, the state information of the ally characters other than the player character PC is updated according to auto-control of those ally characters.

Furthermore, the state-information updating unit 42a stores damage coefficients in the damage-coefficient storage section 64 individually for the target parts TP of the boss character BC. The damage coefficients are preset for each boss character BC. For example, the damage coefficients are output to the player terminal 1 in the battle-game start processing (S101) at the server 100. In the battle-game start processing (S4), the state-information updating unit 42a stores the damage coefficients in the damage-coefficient storage section 64 on the basis of data input from the server 100.

Note that, although not shown, in the data storage area 12b, a mob-character state-information storage section that stores the state information of mob characters SF is provided. In the case where mob characters SF appear in the battle game, the state-information updating unit 42a updates the state information of each of the mob characters SF.

The target identifying unit 44a identifies target parts TP or enemy characters included in the target area TA from the state information of the player character PC (ally characters) and the state information of the boss character BC (enemy characters).

The target setting unit 46a, on the basis of the state information and the damage coefficients, sets the target Ta from among the target parts TP identified by the target identifying unit 44a.

The attack determining unit 48a executes attack determination processing for determining whether or not the target part TP or the enemy character set as the target Ta is to be hit by an attack when an attack operation is input. As will be described later in detail, only the determination as to whether or not an attack should hit is executed at the player terminal 1, and the damage points are determined at the server 100.

The character-action control unit 50a runs the boss character BC (enemy characters) and the player character PC (ally characters) in the game space GS on the basis of the state information. That is, the character-action control unit 50a controls the display of the boss character BC (enemy characters) and the player character PC (ally characters).

Next, the terminal-side battle-game control processing will be described. Note that only processing associated with the boss character BC and the player character PC will be described below.

Figure 9:
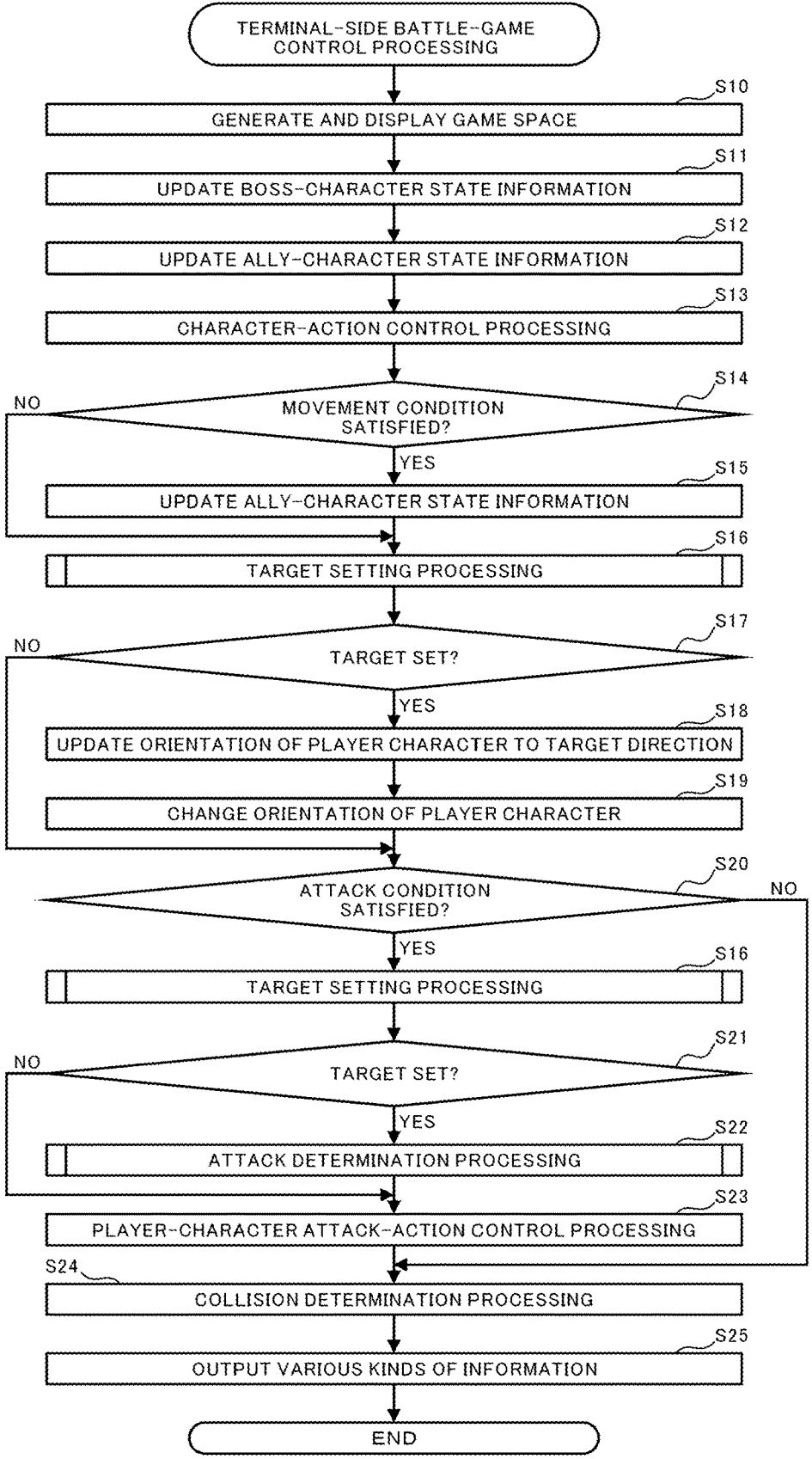
FIG. 9 is a flowchart showing an example of terminal-side battle-game control processing.

FIG. 9 is a flowchart showing an example of the terminal-side battle-game control processing. As described earlier, the terminal-side battle-game control processing at the player terminal 1 and the server-side battle-game control processing at the server 100 are executed concurrently. Furthermore, the terminal-side battle-game control processing and the server-side battle-game control processing are executed on a per-frame basis, and update information is sent and received every frame.

In the terminal-side battle-game control processing, the game-space generating unit 40a generates a game space GS and displays the game space GS on the display 26 (S10). The state-information updating unit 42a updates the state information in the boss-character state-information storage section 60 on the basis of update information input from the server 100 (S11). Furthermore, the state-information updating unit 42a updates the state information in the ally-character state-information storage section 62 on the basis of the update information input from the server 100 (S12).

The character-action control unit 50a runs the boss character BC on the basis of the state information in the boss-character state-information storage section 60 and runs the player character PC on the basis of the state information in the ally-character state-information storage section 62 (S13). For example, in the case where an attack by the boss character BC hit the player character PC, the character-action control unit 50a causes the player character PC to perform a falling action (attacked action).

Furthermore, it is determined whether a movement condition of the player character PC is satisfied (S14). Here, for example, it is determined that the movement condition is satisfied in the case where the player character PC is not performing a predetermined action, such as an attack action or an attacked action, and a movement operation has been input from the movement operation section 22b (YES in S14). When the movement condition is satisfied, the moving direction and the moving amount are identified on the basis of the movement operation, and the state information in the ally-character state-information storage section 62 is updated (S15). Then, the target setting unit 46a executes target setting processing (S16) on the basis of the state information in the ally-character state-information storage section 62.

Figure 10:
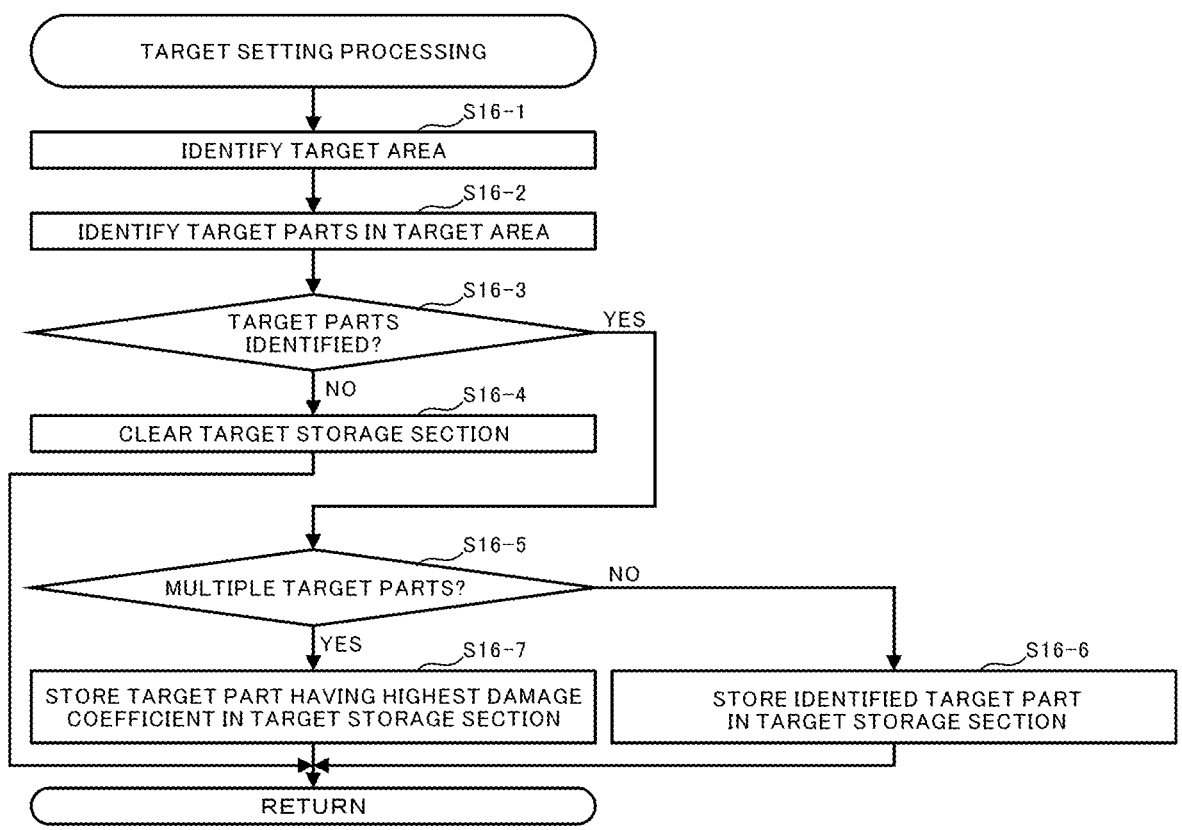
FIG. 10 is a flowchart showing an example of target setting processing.

FIG. 10 is a flowchart showing an example of the target setting processing. The target setting unit 46a identifies the target area TA on the basis of the items of state information in the ally-character state-information storage section 62, including positions, postures, orientations, actions, and weapon information (S16-1). Furthermore, the target identifying unit 44a identifies (extracts) target parts TP in the target area TA on the basis of the position information in the boss-character state-information storage section 60 (S16-2). Then, if no target part TP is identified (NO in S16-3), the target setting unit 46a clears the target storage section 66 (S16-4) and terminates the target setting processing.

Meanwhile, in the case where one or more target parts TP have been identified (YES in S16-3), the target setting unit 46a determines whether or not a plurality of target parts TP have been identified (S16-5). In the case where it is determined that a plurality of target parts TP have not been identified (NO in S16-5), the target setting unit 46a stores the identified target part TP in the target storage section 66 as the target Ta (S16-6) and terminates the target setting processing.

Meanwhile, in the case where it is determined that a plurality of target parts TP have been identified (YES in S16-5), the target setting unit 46a compares the damage coefficients stored in the damage-coefficient storage section 64. Then, the target setting unit 46a stores the target part TP having the greatest damage coefficient in the target storage section 66 as the target Ta (S16-7) and terminates the target setting processing.

Referring back to FIG. 9, in the case where a target part TP is stored in the target storage section 66 (the target Ta is set) (YES in S17), the orientation of the player character PC in the ally-character state-information storage section 62 is updated to the direction of the target Ta (S18). Furthermore, the character-action control unit 50a changes the orientation of the player character PC in the game space GS on the basis of the updated state information (S19).

Furthermore, it is determined whether or not an attack condition of the player character PC is satisfied (S20). Here, for example, it is determined that the attack condition is satisfied in the case where the player character PC is not performing a predetermined action, such as an attack action or an attacked action, and an attack operation has been input from the normal-attack operation section 22c or the special-attack operation section 22d (YES in S20). In the case where it is determined that the attack condition is satisfied, the target setting unit 46a again executes the target setting processing (S16).

Then, in the case where a target part TP is stored in the target storage section 66, i.e., in the case where the target Ta is set (YES in S21), the attack determining unit 48a executes attack determination processing (S22).

Figure 11:
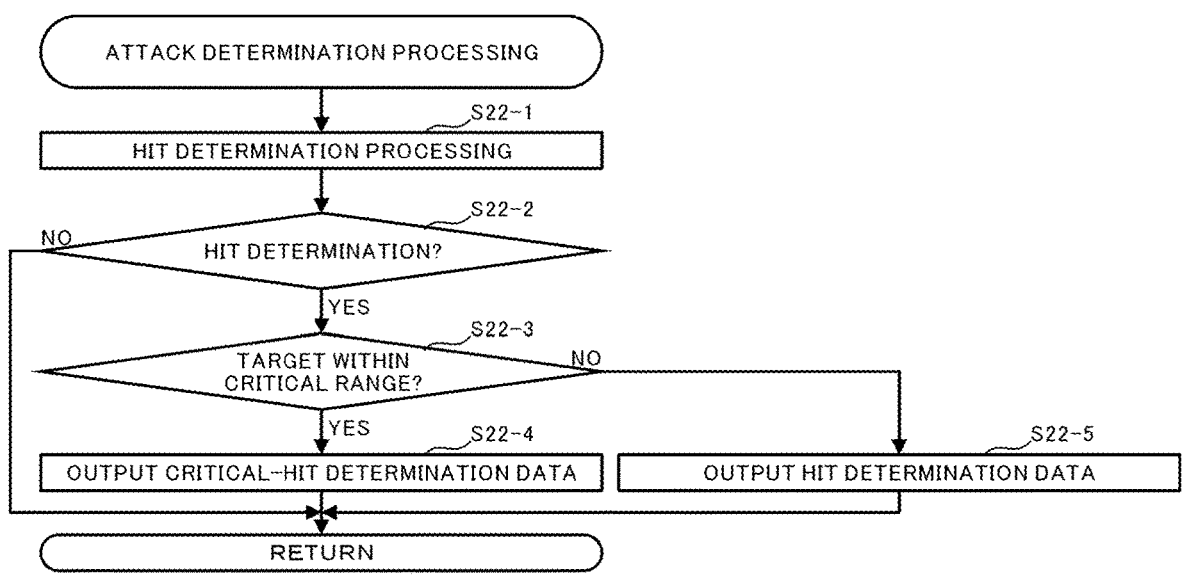
FIG. 11 is a flowchart showing an example of attack determination processing.

FIG. 11 is a flowchart showing an example of the attack determination processing. The attack determining unit 48a executes hit determination processing for determining whether or not an attack by the player character PC should hit the boss character BC (hit determination) (S22-1). In the hit determination processing, a lottery in which a hit determination is derived by a predetermined probability is executed. The probability of derivation of a hit determination may be varied depending on the kind of the boss character BC, the target part TP set as the target Ta, and parameters of the player character PC, such as the attacking power AP and attributes.

In the case where a hit determination is derived (YES in S22-2), the attack determining unit 48a determines whether or not the target part TP set as the target Ta is located within the critical range TAC (S22-3). Here, whether or not the target part TP is located within the critical range TAC is determined from the state information of the target part TP and the state information of the player character PC.

In the case where the target part TP set as the target Ta is located within the critical range TAC (YES in S22-3), the attack determining unit 48a outputs critical-hit determination data to the server 100 (S22-4) and terminates the attack determination processing. Meanwhile, in the case where the target part TP set as the target Ta is not located within the critical range TAC (NO in S22-3), the attack determining unit 48a outputs hit determination data to the server 100 (S22-5) and terminates the attack determination processing.

Note that the critical-hit determination data and the hit determination data here are configured such that it is possible to identify the target part TP hit by an attack and the kind of attack operation (normal attack operation or special attack operation).

Referring back to FIG. 9, the character-action control unit 50a starts an attack action by the player character PC, such as a standing attack action, a flying attack action, or a null swing action, on the basis of whether or not the target Ta is set and the position of the target Ta in the target area TA (S23). When an attack action is started, the attack (weapon) by the player character PC reaches the target part TP set as the target Ta within a range of a few milliseconds to a few seconds.

The character-action control unit 50a executes collision determination processing (S24) each time the terminal-side battle-game control processing is executed. In the collision determination processing, it is determined whether the attack (weapon) by the player character PC reached the target part TP set as the target Ta, i.e., whether or not the attack collided with the target part TP. Specifically, hit ranges are set individually for the weapon of the player character PC and the target part TP. Furthermore, in the collision determination processing, it is determined by a known method whether or not the hit range set for the weapon of the player character PC collided with the hit range set for the target part TP. Then, in the case where it is determined that the attack collided with the target part TP, image control is executed, for example, so as to display an image indicating that the target part TP is damaged. Furthermore, the character-action control unit 50a outputs the state information of the player character PC, the target information indicating the target Ta, etc. to the server 100 (S25). Then, the terminal-side battle-game control processing is terminated.

Figure 12:
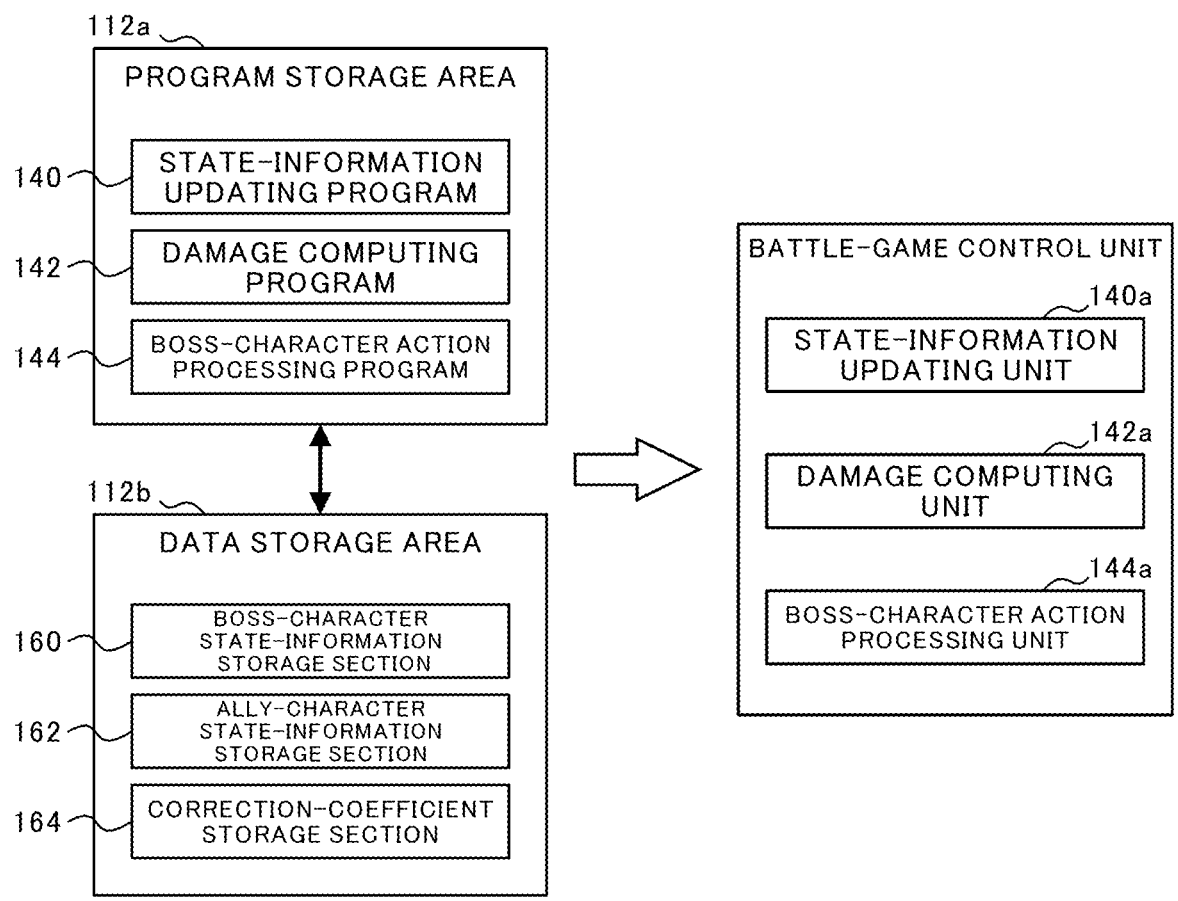
FIG. 12 explains the configuration of a memory and the functions of a computer at the server.

FIG. 12 is a diagram for explaining the configuration of the memory 112 and the functions of a computer at the server 100. In the memory 112, a program storage area 112a and a data storage area 112b are provided. When a battle game is started, the CPU 110 stores programs (modules) for the server-side battle-game control processing in the program storage area 112a.

The programs for the server-side battle-game control processing include a state-information updating program 140, a damage computing program 142, and a boss-character action processing program 144. Note that the programs listed in FIG. 12 are examples, and a large number of other programs are also provided in the programs for the server-side battle-game control processing.

In the data storage area 112b, as storage sections for storing data, a boss-character state-information storage section 160, an ally-character state-information storage section 162, and a correction-coefficient storage section 164 are provided. Note that these storage sections are examples, and a large number of other storage sections are provided in the data storage area 112b.

The CPU 110 runs the individual programs stored in the program storage area 112a and updates the data in the individual storage sections of the data storage area 112b. Furthermore, the CPU 110 runs the individual programs stored in the program storage area 112a, thereby causing the server 100 (computer) to function as a battle-game control unit.

Specifically, the CPU 110 runs the state-information updating program 140, thereby causing the computer to function as a state-information updating unit 140a. Similarly, the CPU 110 runs the damage computing program 142 and the boss-character action processing program 144, thereby causing the computer to function as a damage computing unit 142a and a boss-character action processing unit 144a, respectively.

The state-information updating unit 140a updates the state information indicating the states of the boss character BC (enemy characters) and the ally characters (player character PC). Furthermore, when a battle game is started, the state-information updating unit 140a sets data to the correction-coefficient storage section 164.

The state-information updating unit 140a updates the state information in the boss-character state-information storage section 160 on the basis of processing according to the boss-character action processing program 144. The state information of the boss character BC, managed at the server 100, includes the positions along the x, y, and z axis directions, the posture (tilt), the orientation, an action (the kind of action, etc.), the life points HP, and a break value. These items of state information are stored for each of the target parts TP of the boss character BC. Furthermore, in the boss-character state-information storage section 160, the state information of the boss character BC as a whole in addition to the target parts TP is stored. Note that the life points HP are set only for the boss character BC as a whole and are not set for the target parts TP. Furthermore, the break value is not set for the boss character BC as a whole and is set for each of the target parts TP.

As the break value, a value less than the life points HP is set. Each time an attack by the player character PC (ally characters) hits, a value corresponding to the calculated damage points is subtracted from the life points HP and the break value. When the break value becomes 0, the boss character BC or the target part TP is disabled from performing an action for a certain period. Alternatively, the target part TP may vanish when the break value becomes 0.

Furthermore, the state-information updating unit 140a updates the state information in the ally-character state-information storage section 162. The state information of the ally characters includes the positions along the x, y, and z axis directions, the posture (tilt), an action (information concerning an action being executed, etc.), equipment information concerning a weapon, etc., the life points HP, the normal attacking power, and the special attacking power for each of the ally characters organized into the party. The state-information updating unit 140a updates the state information concerning the positions of the ally characters, such as the positions, postures (tilts), and actions, on the basis of the state information input from the player terminal 1.

Furthermore, the state-information updating unit 140a updates the life points HP in accordance with the damage points calculated through damage computation processing, which will be described later. Note that, of the state information, the equipment, the normal attacking power, and the special attacking power are set by the state-information updating unit 140a on the basis of player information accumulated in the memory 112 when a battle game is started.

Furthermore, when a battle game is started, the state-information updating unit 140a sets data in the correction-coefficient storage section 164 on the basis of the player information accumulated in the memory 112. The correction-coefficient storage section 164 stores three items of data, namely, an attribute coefficient, a weapon coefficient, and a damage coefficient, as correction coefficients.

All of these correction coefficients are used when calculating damage points to be assigned to the boss character BC, and are set for each of the target parts TP. Furthermore, the attribute coefficient has a value set in accordance with the attribute "fire", "wind", or "water", and the weapon coefficient has a value set in accordance with the equipped weapon. Here, the damage coefficient has the greatest influence on the damage points among the three correction coefficients.

Note that, although not shown, a mob-character state-information storage section that stores the state information of mob characters SF is provided in the data storage area 112b. In the case where mob characters SF appear in the battle game, the state-information updating unit 140a updates the state information of each of the mob characters SF.

The damage computing unit 142a, on the basis of the state information and the correction coefficients, calculates the damage points to be assigned to the target part TP set as the target Ta.

The boss-character action processing unit 144a controls movement actions and attack actions of the boss character BC (enemy characters).

Next, the server-side battle-game control processing will be described.

Figure 13:
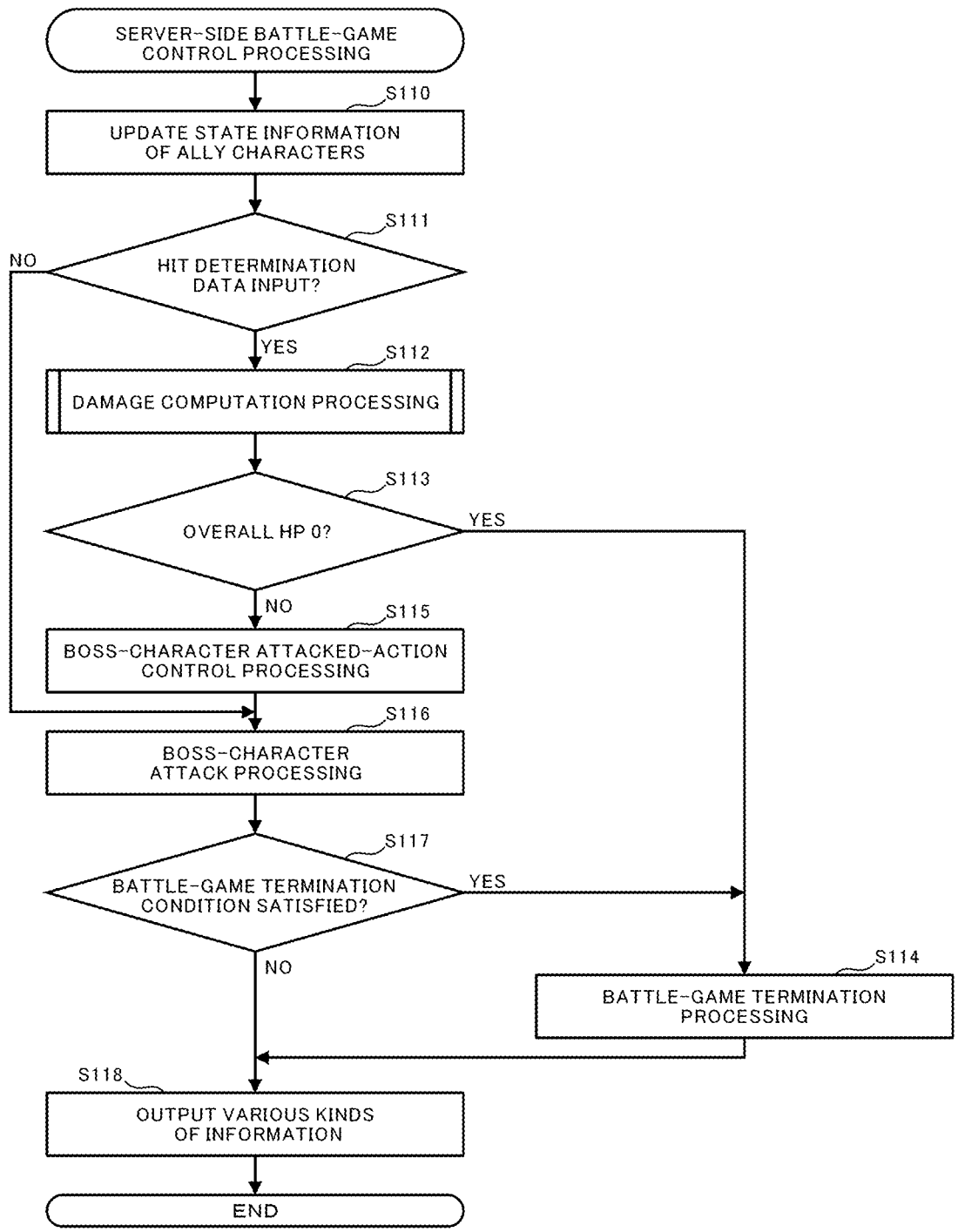
FIG. 13 is a flowchart showing an example of server-side battle-game control processing.

FIG. 13 is a flowchart showing an example of the server-side battle-game control processing. The state-information updating unit 140a updates the ally-character state-information storage section 162 on the basis of the state information of the ally characters, input from the player terminal 1 (S110). Then, when hit determination data (including critical-hit determination data) is input from the player terminal 1 (YES in S111), the damage computing unit 142a executes damage computation processing (S112).

Figure 14:
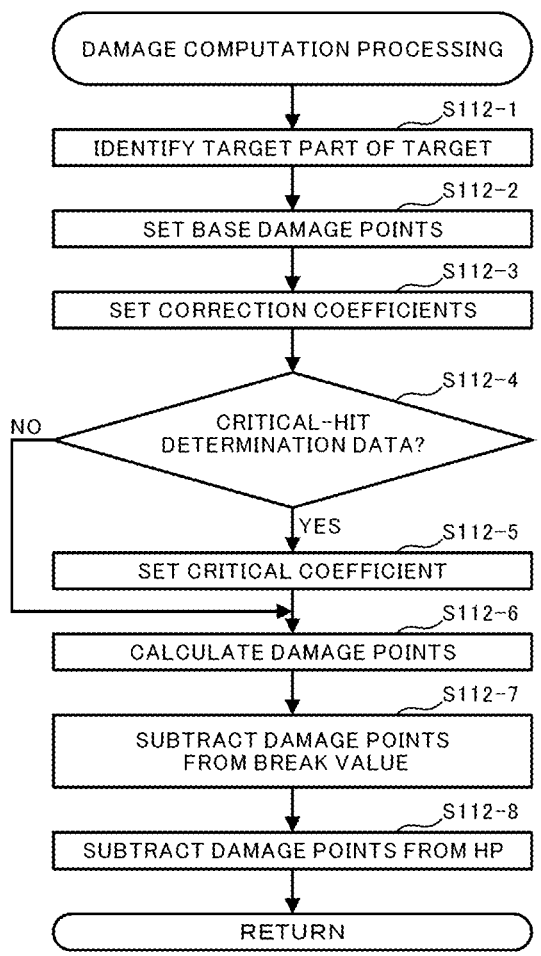
FIG. 14 is a flowchart showing an example of damage computation processing.

FIG. 14 is a flowchart showing an example of the damage computation processing (S112). The damage computing unit 142a analyzes the hit determination data (including critical-hit determination data) to identify the target part TP set as the target Ta (S112-1). Furthermore, the damage computing unit 142a identifies the ally character that has performed an attack action as well as the type of attack, and sets the normal attacking power or the special attacking power stored in the ally-character state-information storage section 162 into a computation formula as the base damage points (S112-2).

Then, the damage computing unit 142a loads the correction coefficients stored in the correction-coefficient storage section 164 and sets the correction coefficients into the computation formula (S112-3). Here, the attribute coefficient is set from the attribute of the ally character that has performed the attack action, as well as the target part TP. Furthermore, the weapon coefficient is set from the weapon that the ally character that has performed the attack action is equipped with, as well as the target part TP. Furthermore, the damage coefficient is set on the basis of the target part TP.

Then, in the case where critical-hit determination data is input (YES in S112-4), furthermore, a critical coefficient is set in the computation formula (S112-5). Note that the critical coefficient may be set to have a uniform value or to have different values for individual weapons, where the value or values are predetermined values greater than 1.

The damage computing unit 142a calculates damage points according to the computation formula (S112-6). Furthermore, the damage computing unit 142a subtracts the calculated damage points from the break value of the target part TP set as the target Ta in the boss-character state-information storage section 160 (S112-7). Furthermore, the damage computing unit 142a subtracts the calculated damage points from the overall life points HP in the boss-character state-information storage section 160 (S112-8) and terminates the damage computation processing.

Referring back to FIG. 13, when the overall life points HP in the boss-character state-information storage section 160 become 0 (YES in S113), battle-game termination processing for terminating the battle game is executed. Meanwhile, if the overall life points HP in the boss-character state-information storage section 160 are not zero (NO in S113), the boss-character action processing unit 144a causes the boss character BC to perform an attacked action when the boss character BC is damaged (S115).

Furthermore, the boss-character action processing unit 144a executes boss-character attack processing for attacking the player character PC according to a predetermined algorithm (S116). Here, the hit determination processing, the damage computation processing, and the updating of the ally-character state-information storage section 162 are executed. Then, when the life points HP of the player character PC become 0 or when the life points HP of all the ally characters become 0, it is determined that a condition for terminating the battle game is satisfied (YES in S117), and the battle-game termination processing is executed (S114).

Meanwhile, in the case where the condition for terminating the battle game is not satisfied (NO in S117), and in the case where the battle-game termination processing has been executed, update information including the state information of the boss character BC and the player character PC is output to the player terminal 1 (S118). Then, the server-side battle-game control processing is terminated.

A battle game is realized through the terminal-side battle-game control processing at the player terminal 1 and the server-side battle-game control processing at the server 100, described above.

Note that, in the embodiment described above, in the case where a plurality of target parts TP are included in the target area TA, the target part TP having the greatest damage coefficient is set as the target Ta. Alternatively, however, the target part TP having the smallest damage coefficient may be set as the target Ta. That is, in the case where a plurality of target parts TP having different correction coefficients are included in the target area TA, it is possible to set the target part TP having the greatest or smallest correction coefficient as the target Ta. Alternatively, the target setting unit 46a may set the target part TP having a damage coefficient closest to a predetermined value as the target Ta.

Furthermore, for example, the target Ta may be set on the basis of other correction coefficients, such as the attribute coefficient or the weapon coefficient. Alternatively, the target Ta may be set on the basis of a combination of a plurality of correction coefficients used for the calculation of damage points. Alternatively, the target Ta may be set on the basis of a special comparative value provided for the setting of the target Ta.

In any case, in the case where a plurality of target parts TP are included in the target area TA, the target setting unit 46a can set the target Ta from among the plurality of target parts TP on the basis of the result of comparison of comparative values set for the individual target parts TP. The processing load can be reduced in the case where the target Ta is set by using comparative values set for the individual target parts TP.

In the embodiment described above, damage points are calculated on the basis of various parameters. Thus, depending on the method of calculating damage points, there are cases where the damage points for the target part TP having the greatest damage coefficient become less than the damage points for a target part TP having a relatively smaller damage coefficient. Thus, for example, the target setting unit 46a may calculate predetermined comparative values for the individual target parts TP and may set the target Ta on the basis of the result of comparison of the calculated comparative values.

Figure 15:
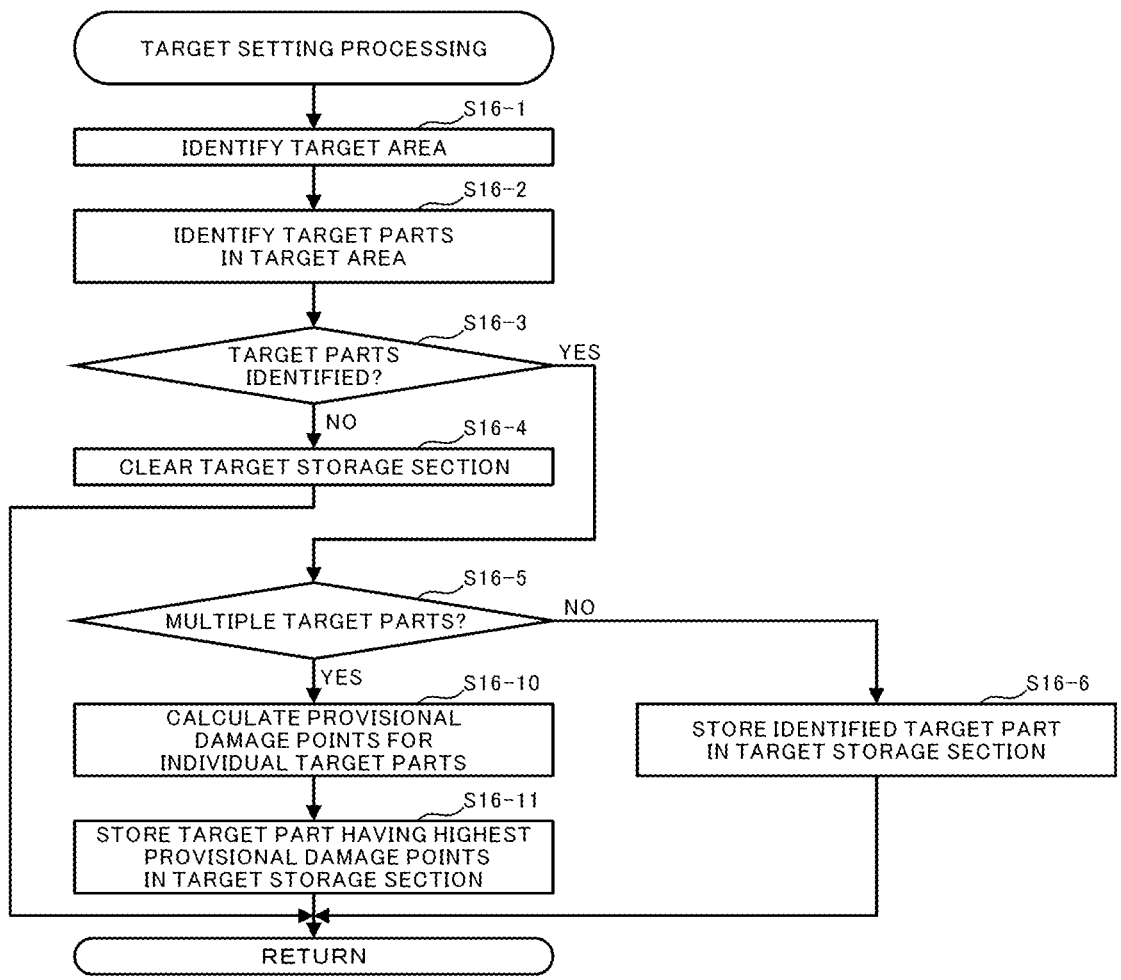
FIG. 15 is a flowchart explaining target setting processing in a first modification.

FIG. 15 is a flowchart for explaining target setting processing in a first modification. In the first modification, the processing from S16-1 to S16-6 is not changed from that in the embodiment described above. Thus, the processing that is the same as that in the embodiment described above will not be described.

In the case where it is determined that a plurality of target parts TP have been identified (YES in S16-5), the target setting unit 46a calculates provisional damage points for each of the target parts TP (S16-10). Note that, in the embodiment described above, parameters for calculating damage points are stored in the memory 112 of the server 100, and parameters other than damage coefficients are not provided at the player terminal 1.

Meanwhile, in the first modification, all the parameters used for calculating damage points are also stored in the memory 12 of the player terminal 1. The target setting units 46a calculate provisional damage points for each of the target parts TP on the basis of the individual parameters. Note that the computation formula for calculating provisional damage points may be the same as the computation formula for calculating damage points or may be different (e.g., an approximation formula) therefrom.

The target setting unit 46a compares the calculated provisional damage points for the individual target parts TP, stores the target part TP having the greatest provisional damage points as the target Ta in the target storage section 66 (S16-11), and terminates the target setting processing.

According to the first modification, it is possible to reliably set the target part TP having the greatest damage points to be assigned among a plurality of target parts TP as the target Ta. In other words, the target part TP that is most advantageous for the player among a plurality of target parts TP is set as the target Ta.

Note that, also in the first modification, the target setting unit 46a may set the target part TP having the least calculated provisional damage points as the target Ta. That is, in the case where a plurality of target parts TP are included in the target area TA, the target setting unit 46a can set the target part TP having the greatest or least damage points as the target Ta.

Furthermore, in the embodiment described above, damage points are subtracted from a break value. Alternatively, however, for example, special break points to be subtracted from a break value may be provided. In this case, the target setting unit 46a may calculate provisional break points for the individual target parts TP as comparative value and may set the target Ta on the basis of the provisional break points.

As described above, it suffices for the target setting unit 46a to set the target Ta on the basis of the result of comparison of comparative values set or calculated for the individual target parts TP, and there is no particular limitation to the comparative values.

Furthermore, in the above-described embodiment and the first modification, attack determination processing is executed for the target part TP set as the target Ta at the player terminal 1. Furthermore, in the case where a hit determination results in the attack determination processing, damage computation processing is executed at the server 100. That is, in the embodiment described above, damage points are assigned to the target part TP set as the target Ta on the basis of at least the correction coefficients (damage coefficient) of that target part TP.

However, the processing for the target part TP set as the target Ta (hit processing) is not limited to the processing described above. As an example, damage points may be necessarily assigned to the target part TP set as the target Ta. As another example, the attack determination processing may be necessarily executed for the target part TP set as the target Ta, and damage points may be assigned uniformly in the case where a hit determination results. As another example, just the calculation of damage points may be executed in the hit processing, and the calculated damage points may be assigned just to the boss character BC as a whole.

Furthermore, for example, as the hit processing, whether or not to break the target part TP set as the target Ta may be determined by a lottery, and the target part TP may be deleted in the case where this lottery is won. In any case, the hit processing (the attack determination processing in the embodiment described above) executed by the processing unit (the attack determining unit 48a in the embodiment described above) may be any processing concerning an attack to the target part TP set as the target Ta, and the content of the hit processing may be designed as appropriate. Thus, the collision determination processing described earlier may be executed as the hit processing.

Furthermore, in the above-described embodiment and the first modification, an attack action is performed on just one target part TP. Alternatively, however, in the case where a plurality of target parts TP are included in the target area TA, two or more target parts TP may be set as the target Ta. Yet alternatively, for example, as in a second modification, which will be described below, one-part attack actions, in which an attack action is performed on just one target part TP, and multiple-part attack actions, in which an attack action is performed on all the target parts TP in the target area TA, may be provided.

Figure 16:
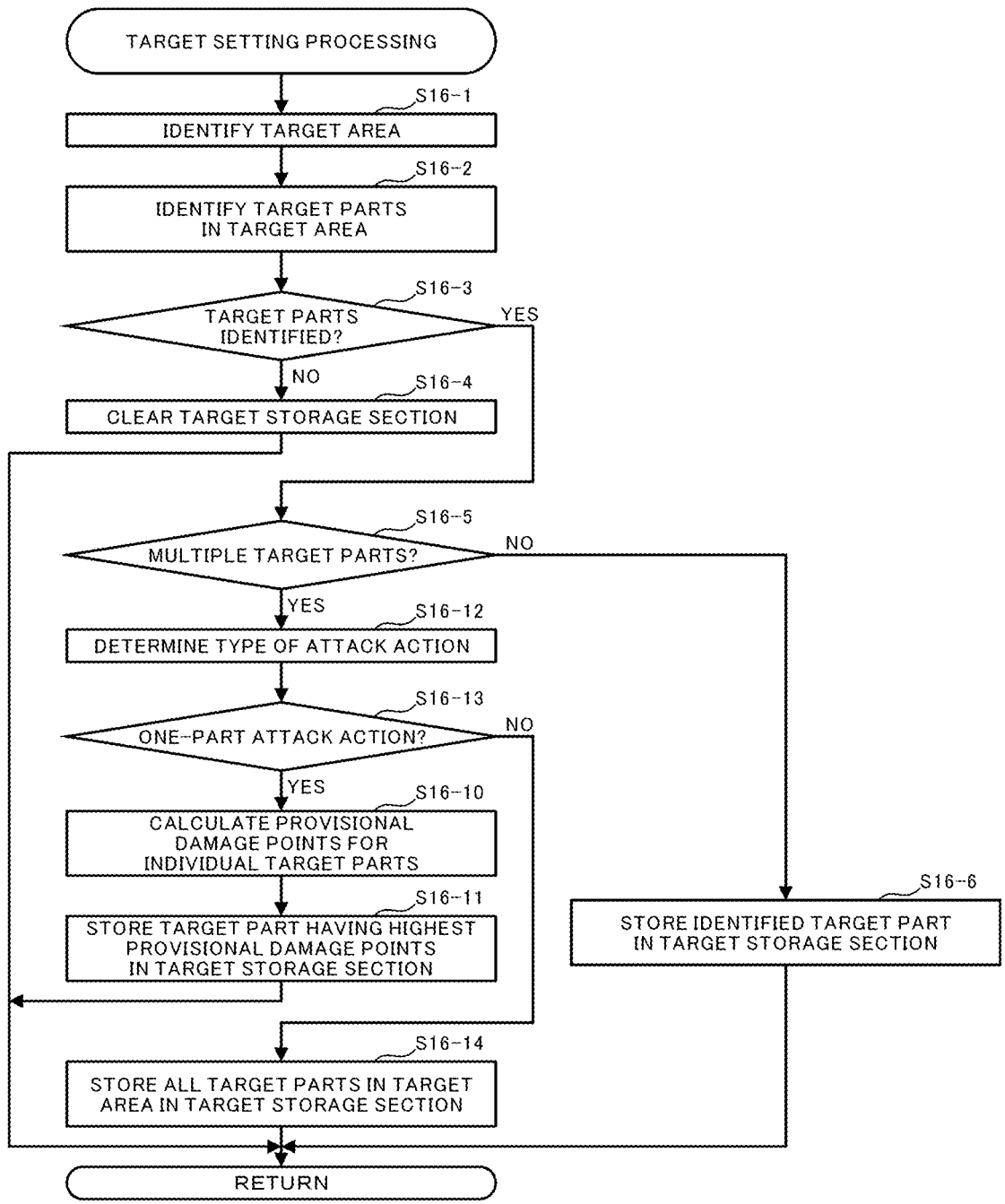
FIG. 16 is a flowchart explaining target setting processing in a second modification.

FIG. 16 is a flowchart for explaining target setting processing in a second modification. In the second modification, the processing in S16-1 to S16-6, S16-10, and S16-11 is not changed from that in the first modification described above. Thus, here, the processing that is the same as that in the first modification described above will not be described.

Furthermore, the target setting processing in the second modification is processing that is executed only when the attack condition is satisfied in the terminal-side battle-game control processing shown in FIG. 9. Thus, the target setting processing that is constantly being executed while an attack operation is not input is the same as that in the above-described embodiment or the first modification.

In the case where it is determined that a plurality of target parts TP have been identified (YES in S16-5), the target setting unit 46a determines the kind of attack action (S16-12). Here, as an example, either a one-part attack action or a multiple-part attack action is determined as the kind of attack action by a lottery. As another example, the player may be allowed to choose either a one-part attack action or a multiple-part attack action.

When a one-part attack action is determined as an attack action (YES in S16-13), the target setting unit 46a calculates provisional damage points for the individual target parts TP (S16-10), and stores the target part TP having the greatest provisional damage points as the target Ta in the target storage section 66 (S16-11).

Meanwhile, when a multiple-part attack action is determined as an attack action (NO in S16-13), the target setting unit 46a sets all the target parts TP in the target area TA, identified in S16-2, as the target Ta in the target storage section 66 (S16-14). In the case where a plurality of target parts TP are set as the target Ta, the attack determination processing is executed for all the target parts TP set as the target Ta.

As described above, attack actions in which a plurality of target parts TP are set as the target Ta may be provided separately from attack actions in which just one target part TP is set as the target Ta.

Figure 17:
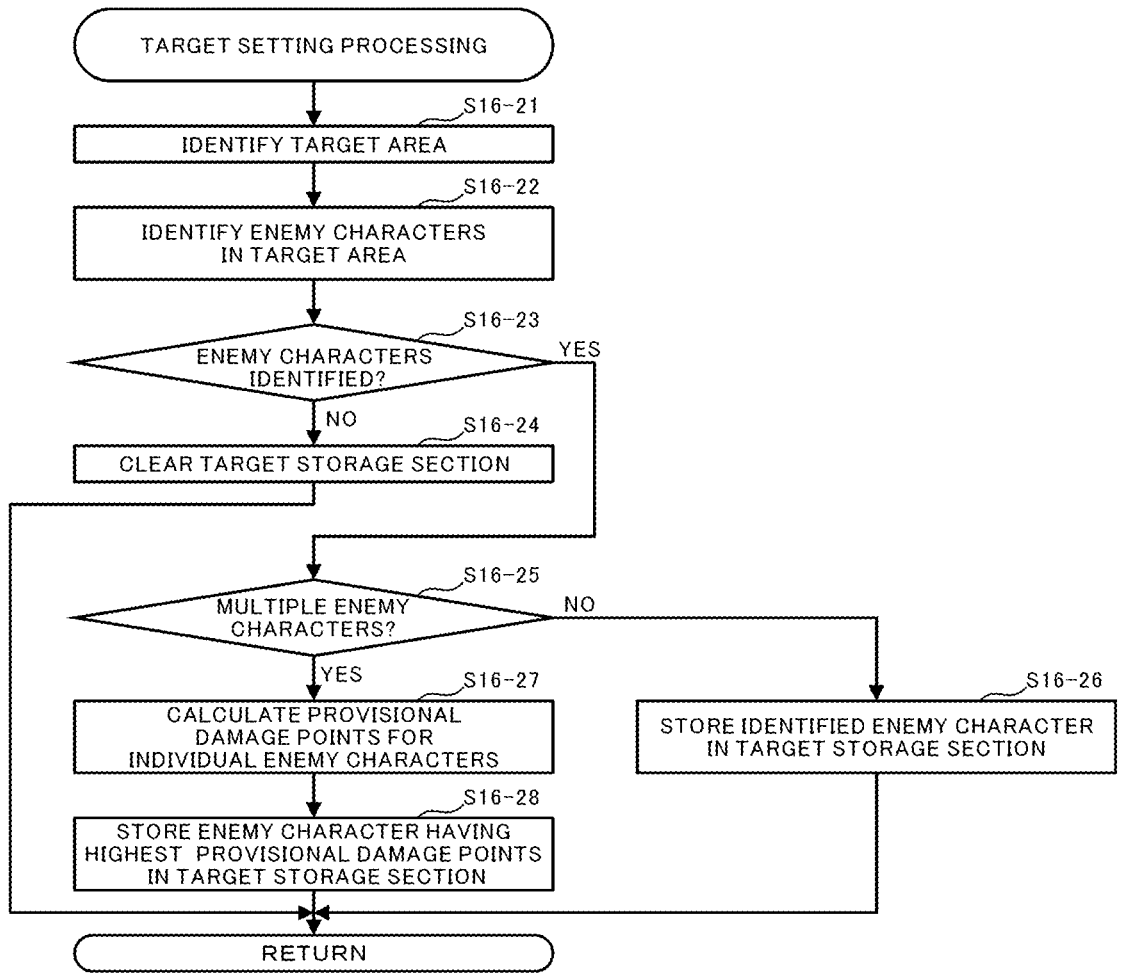
FIG. 17 is a flowchart explaining target setting processing in a second embodiment.

FIG. 17 is a flowchart for explaining target setting processing in a second embodiment. The above-described embodiment and modifications have been described in the context of the case where a boss character BC having a plurality of target parts TP set therein is disposed in the game space GS. That is, in the above-described embodiment and modifications, in the case where a plurality of target parts TP of a single target object (boss character BC) are included in the target area TA, the target setting unit 46a sets one of the target parts TP as the target Ta. However, the processing concerning the target parts TP in the above-described embodiment and modifications may also be applied to a plurality of enemy characters that perform actions independently of each other.

Specifically, in the target setting processing in the second embodiment, the target setting unit 46a identifies the target area TA (S16-21). Furthermore, the target setting unit 46a identifies enemy characters in the target area TA on the basis of the position information of the individual enemy characters (S16-22). Then, if no enemy character is identified (NO in S16-23), the target setting unit 46a clears the target storage section 66 (S16-24) and terminates the target setting processing.

Meanwhile, in the case where one or more enemy characters have been identified (YES in S16-23), the target setting unit 46a determines whether or not a plurality of enemy characters have been identified (S16-25). In the case where it is determined that a plurality of enemy characters have not been identified (NO in S16-25), the target setting unit 46a stores the identified enemy character as the target Ta in the target storage section 66 (S16-26).

Meanwhile, in the case where it is determined that a plurality of enemy characters have been identified (YES in S16-25), the target setting unit 46a calculates provisional damage points for the individual enemy characters (S16-27). In the second embodiment, similarly to the first modification, all the parameters used for calculating damage points are also stored in the memory 12 of the player terminal 1. The target setting unit 46a calculates provisional damage points for the individual enemy characters on the basis of the individual parameters. The computation formula for calculating provisional damage points may be the same as the computation formula for calculating damage points or may be different therefrom.

The target setting unit 46a compares the calculated provisional damage points, and stores the enemy character having the greatest provisional damage points as the target Ta in the target storage section 66 (S16-28). Note that, in the second embodiment, the enemy character having the least provisional damage points may be set as the target Ta. Also with the second embodiment, operations and advantages similar to those of the above-described embodiment and modifications are realized.

Figure 18:
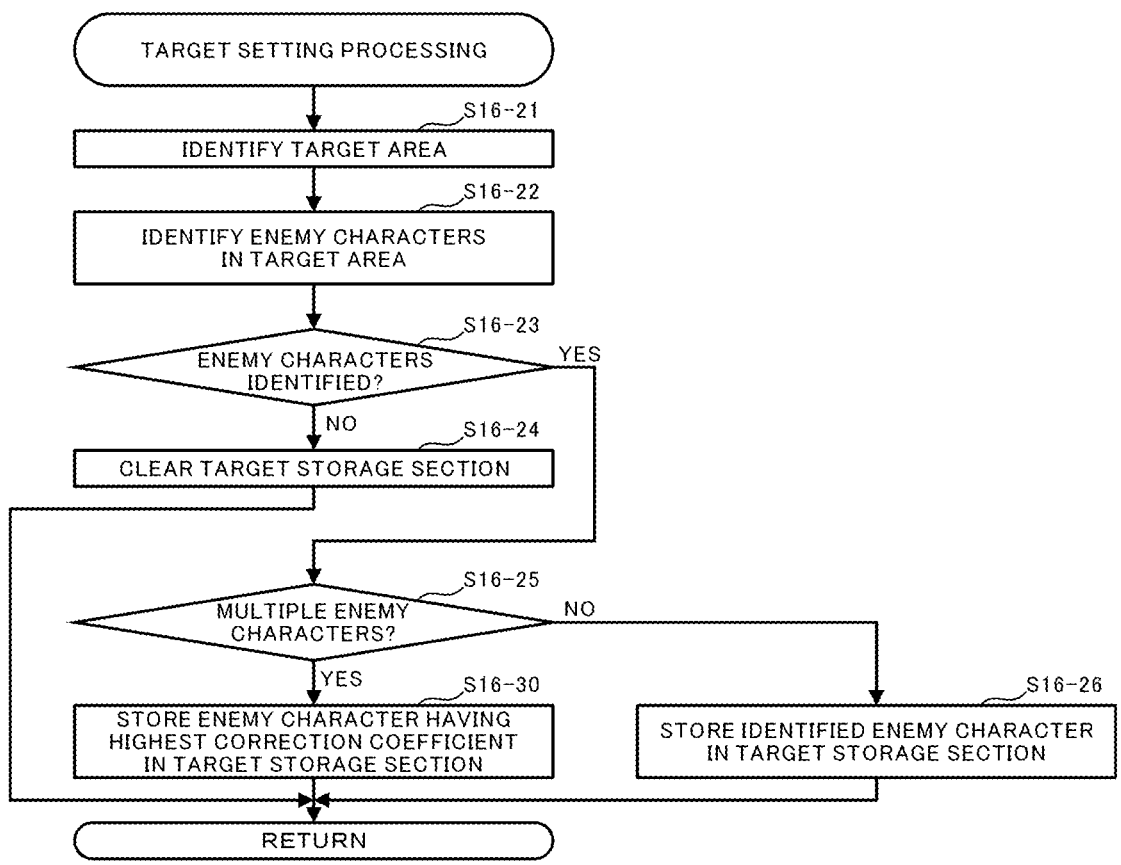
FIG. 18 is a flowchart explaining target setting processing in a modification of the second embodiment.

FIG. 18 is a flowchart for explaining target setting processing in a modification of the second embodiment. In the modification of the second embodiment, the processing from S16-21 to S16-26 is not changed from that in the second embodiment described above. Thus, the processing that is the same as that in the second embodiment described above will not be described.

In the case where it is determined that a plurality of enemy characters have been identified (YES in S16-25), the target setting unit 46a stores the enemy character having the greatest correction coefficient as the target Ta in the target storage section 66 (S16-30).

Here, correction coefficients are set for individual enemy characters. Similarly to the embodiment described above, a plurality of coefficients or a single coefficient may be provided as the correction coefficients. In the case where a single correction coefficient is provided, the damage points for the enemy character having the greatest correction coefficient becomes the greatest. Alternatively, in the modification of the second embodiment, the enemy character having the smallest correction coefficient may be set as the target Ta. Also with the modification of the second embodiment, operations and advantages similar to those of the above-described embodiments and modifications are realized.

Note that, also in the second embodiment and the modification thereof, it suffices that at least either of a player object (e.g., the player character PC) and a plurality of target objects (e.g., enemy characters), disposed in the virtual game space GS, perform actions. Furthermore, target objects included in the target area TA set for the player object are identified.

Furthermore, in the above-described embodiments and modifications, processing for the case where the boss character BC and mob characters SF are included in the target area TA may be added. For example, in the target setting processing in the above-described embodiments and modifications, the target setting unit 46a identifies the target area TA (S16-1 or S16-21). Then, the target setting unit 46a identifies enemy characters in the target area TA in S16-2 or S16-22.

At this time, in the case where a plurality of enemy characters have been identified, the target setting unit 46a determines one of the identified enemy characters as a candidate target according to a predetermined condition. Here, the predetermined condition is, for example, being nearest to the player character PC or priority levels set for individual enemy characters. In the case where the enemy character determined as the candidate target is a mob character SF, the target setting unit 46a determines the candidate target as the target Ta.

Meanwhile, in the case where the enemy character determined as the candidate target is the boss character BC, the target setting unit 46a executes processing after S16-5 or S16-25, similarly to the above-described embodiments and modifications. That is, in the case where the boss character BC is determined as the candidate target, one of the target parts TP of the boss character BC is determined as the target Ta on the basis of provisional damage points or correction coefficients.

Furthermore, in the case where a plurality of target objects are included in the target area TA, the target setting unit 46a should set, as the target Ta, the target object with which predetermined points (e.g., damage points) that are assigned on a per-target-object basis become the greatest or the least. Then, predetermined hit processing for assigning points to the target object set as the target Ta is executed.

In the above-described embodiments and modifications, the player character PC is disposed in the game space GS as a player object, and enemy characters are disposed as target objects (target parts TP) in the game space GS. However, the player character PC and the enemy characters are merely examples, and the player object and target objects (target parts TP) can be designed as appropriate.

Furthermore, in the above-described embodiments and modifications, the character-action control unit 50a causes both the player object and the target objects (target parts TP) to perform actions in the game space GS. However, it suffices that at least either of the player object and the target objects (target parts TP) perform actions in the game space GS.

Furthermore, in the above-described embodiments and modifications, the target setting unit 46a sets the target Ta when a target object (target part TP) is included in the target area TA. Furthermore, the target setting unit 46a sets the target Ta when an attack operation (hit operation) is input.

As described above, the target setting unit 46a sets the target Ta at two different conditions and timings. However, the conditions and timings at which the target setting unit 46a sets the target Ta are not limited to those in the above-described embodiments and modifications. Furthermore, the target setting unit 46a may set the target Ta at a single condition or timing.

Furthermore, in the above-described embodiments and modifications, calculated points (damage points) are assigned to both a target object (the boss character BC as a whole) and a target part TP. However, it suffices that calculated points (damage points) are assigned to either a target object (the boss character BC as a whole) or a target part TP.

Furthermore, the above-described embodiments and modifications have been described in the context of the case where a game proceeds in the state where the player terminal 1 and the server 100 are communicatively connected. The above division of roles of the player terminal 1 and the server 100 is merely an example. Thus, as an example, the above-described attack determination processing and target setting processing may be executed at the server 100. As another example, the above-described damage computation processing may be executed at the player terminal 1. Furthermore, the various kinds of processing described above may be executed entirely at the player terminal 1 or the server 100.

Furthermore, the above-described embodiments and modifications have been described in the context of the case where the player character PC performs actions in accordance with player operations. Alternatively, however, the player character PC may perform actions by means of auto-operations based on a program.

Furthermore, in the above-described embodiments and modifications, a battle game is realized by the information processing system S, which is a client-server system, executing the various kinds of information processing described above. Alternatively, however, in the above-described embodiments and modifications, the programs stored in the memory 12 or 112 may be installed in a game device G not having a communication function.

Furthermore, in the above-described embodiments and modifications, the program for realizing a battle game may be stored in a computer-readable storage medium. Alternatively, the above-described embodiments and modifications may be embodied as information processing methods for realizing the functions and the steps shown in the flowcharts.

Although an aspect of an embodiment has been described with reference to the accompanying drawings, it goes without saying that the present invention is not limited to the embodiments described above. It would be obvious that a person skilled in the art could conceive of various modifications and amendments within the scope recited in the claims, and it will be understood that those modifications and amendments obviously belong to the technical scope of the present invention.

INDUSTRIAL APPLICABILITY

The present invention is applicable to information processing programs, information processing methods, and game devices.

What is claimed is:

1. A non-transitory computer readable medium storing a program causing a computer to execute:
    moving a player object displayed in a virtual game space, the player object including a target area;
    identifying a plurality of target parts of a target object included in the target area;
    determining that more than one target part of the plurality of target parts is included in the target area;
    obtaining a predetermined damage coefficient value for each target part among the plurality of target parts that are disposed in the target area;
    setting, in response to determining that more than one target part is included in the target area, a set target part from among the plurality of target parts in the target area based on a comparison of the plurality of damage coefficient values; and
    executing predetermined hit processing on the set target part,
    wherein setting the set target part from among the plurality of target parts in the target area comprises:
        setting the target part that has a highest damage coefficient value or a lowest damage coefficient value in the target area as the set target part, and
    wherein executing the predetermined hit processing on the set target part comprises:
        calculating a plurality of damage points based on the damage coefficient value of the set target part, and
        applying the plurality of damage points to the set target part.

2. The non-transitory computer readable medium according to claim 1, the program causing the computer to execute:

when a single target part of the plurality of target parts is included in the target area, setting the single target part in the target area as the set target part.

3. The non-transitory computer readable medium according to claim 1, when a predetermined hit operation is input by a player, the program causing the computer to execute setting the set target part from among the plurality of target parts in the target area, and executing the predetermined hit processing on the set target part.

4. The non-transitory computer readable medium according to claim 1, wherein the program is further configured to execute:
 determining a kind of weapon that is equipped by the player object; and
 determining the target area based on a predetermined range associated with the kind of weapon that is equipped by the player object,
 wherein the target area is selected based on a plurality of areas located within the predetermined range of the player object.

5. An information processing method comprising steps of:
 moving a player object displayed in a virtual game space, the player object including a target area;
 identifying a plurality of target parts of a target object included in the target area;
 determining that more than one target part of the plurality of target parts is included in the target area;
 obtaining a predetermined damage coefficient value for each target part among the plurality of target parts that are disposed in the target area;
 setting, in response to determining that more than one target is included in the target area, a set target part from among the plurality of target parts in the target area-based on a comparison of the plurality of damage coefficient values; and
 executing predetermined hit processing on the set target part,
 wherein setting the set target part from among the plurality of target parts in the target area comprises:
  setting the target part that has a highest damage coefficient value or a lowest damage coefficient value in the target area as the set target part, and
 wherein executing the predetermined hit processing on the set target part comprises:
  calculating a plurality of damage points based on the damage coefficient value of the set target part, and
  applying the plurality of damage points to the set target part.

6. A game device comprising a computer configured to execute:
 moving a player object displayed in a virtual game space, the player object including a target area;
 identifying a plurality of target parts of a target object included in the target area;
 determining that more than one target part of the plurality of target parts is included in the target area;
 obtaining a predetermined damage coefficient value for each target part among the plurality of target parts that are disposed in the target area;
 setting, in response to determining that more than one target is included in the target area, a set target part from among the plurality of target parts in the target area based on a comparison of the plurality of damage coefficient values; and
 executing predetermined hit processing on the set target part,
 wherein setting the set target part from among the plurality of target parts in the target area comprises:
  setting the target part that has a highest damage coefficient value or a lowest damage coefficient value in the target area as the set target part, and
 wherein executing the predetermined hit processing on the set target part comprises:
  calculating a plurality of damage points based on the damage coefficient value of the set target part, and
  applying the plurality of damage points to the set target part.

* * * * *